(12) United States Patent
Takayanagi et al.

(10) Patent No.: US 7,855,875 B2
(45) Date of Patent: Dec. 21, 2010

(54) IMAGE DISPLAY DEVICE AND ELECTRONIC APPARATUS

(75) Inventors: Masaya Takayanagi, Kawasaki (JP); Masuo Ohnishi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 12/081,861

(22) Filed: Apr. 22, 2008

(65) Prior Publication Data

US 2008/0259540 A1    Oct. 23, 2008

(30) Foreign Application Priority Data

Apr. 23, 2007   (JP) ............................. 2007-113557

(51) Int. Cl.
 *H05K 7/00*   (2006.01)
(52) U.S. Cl. .................. 361/679.09; 524/450; 313/498; 174/539; 206/761
(58) Field of Classification Search ............ 361/679.05, 361/679.21, 679.27, 679.28, 679.29; 524/450; 313/498; 399/175; 312/140; 174/68.3, 136, 174/539; 439/76.2, 797; 206/761
See application file for complete search history.

(56) References Cited

U.S. PATENT DOCUMENTS

| | | | |
|---|---|---|---|
| 5,146,354 A | 9/1992 | Plesinger | |
| 5,666,172 A | 9/1997 | Ida et al. | |
| 5,926,237 A | 7/1999 | Yun et al. | |
| 6,759,642 B2 | 7/2004 | Hoshino | |
| 6,812,976 B2 | 11/2004 | Satonaka | |
| 6,856,363 B2 | 2/2005 | Kim | |
| 6,956,637 B2 | 10/2005 | Satonaka | |
| 6,979,144 B2 | 12/2005 | Iwasaki | |
| 7,125,155 B2 | 10/2006 | Sakuda et al. | |
| 7,218,732 B2 | 5/2007 | Tanaka et al. | |
| 7,391,443 B2 | 6/2008 | Kojima et al. | |
| 7,435,018 B2 | 10/2008 | Huang et al. | |
| 7,701,527 B2 * | 4/2010 | Hsu | ............................. 349/58 |

(Continued)

FOREIGN PATENT DOCUMENTS

JP    5-3476    1/1993

(Continued)

OTHER PUBLICATIONS

Office Action mailed Jun. 8, 2010 in corresponding Japanese Patent Application No. 2007-113557.

(Continued)

*Primary Examiner*—Hung V Duong
(74) *Attorney, Agent, or Firm*—Staas & Halsey LLP

(57) ABSTRACT

An image display device has: a display panel having a display screen to display an image on a front surface; a case that accommodates the display panel, the case having a standing wall section that surrounds a surroundings edge of the display panel alienating from the surroundings edge; and a cover that covers a portion between the surroundings edge of the display panel and the standing wall section of the case. The device further has: a frame having a putting section where a back surroundings edge of the display panel is placed, and an isolation section touching side of the display panel and it separates between the display panel and the standing wall section of the case; and wiring that passes between the isolation section and the standing wall section.

14 Claims, 24 Drawing Sheets

U.S. PATENT DOCUMENTS

| | | |
|---|---|---|
| 2002/0034064 A1 | 3/2002 | Kim |
| 2003/0103173 A1 | 6/2003 | Satonaka |
| 2004/0075620 A1 | 4/2004 | Tanaka et al. |
| 2004/0196413 A1 | 10/2004 | Satonaka |
| 2006/0066769 A1 | 5/2006 | Minaguchi et al. |
| 2006/0197862 A1 | 9/2006 | Lung |
| 2008/0170141 A1 | 7/2008 | Tam et al. |
| 2008/0259539 A1* | 10/2008 | Iwata et al. ............. 361/680 |
| 2008/0259546 A1* | 10/2008 | Takayanagi et al. ...... 361/681 |
| 2008/0259565 A1* | 10/2008 | Iwata et al. ............. 361/697 |

FOREIGN PATENT DOCUMENTS

| | | |
|---|---|---|
| JP | 9-5744 | 1/1997 |
| JP | 11-338371 | 10/1999 |
| JP | 2001-249621 | 9/2001 |
| JP | 2002-268063 | 9/2002 |
| JP | 2003-167235 | 6/2003 |
| JP | 2004-120670 | 4/2004 |
| JP | 2005-236154 | 9/2005 |
| JP | 2006-099242 | 4/2006 |
| JP | 2008-083982 | 4/2008 |

OTHER PUBLICATIONS

Search Report for corresponding Taiwanese Application No. 097112837, issued on Oct. 4, 2010.

* cited by examiner

IMAGE DISPLAY DEVICE AND ELECTRONIC APPARATUS

BACKGROUND OF THE INVENTION

1. Field of the Invention

The present invention relates to an image display device for displaying an image, and an electronic apparatus which is equipped with the image display device.

2. Description of the Related Art

Hitherto, there is utilized a so-called notebook-sized personal computer that is composed of an image display device wherein an image display unit, which comprises a display screen for displaying an image on a surface thereof and the associated wiring, is set to a case, and a main frame device being provided with a keyboard on the top and having an arithmetic operation function, in which the image display device is coupled with the main frame device in such a way that opening and shutting is free between a shutting state wherein the display screen is inward piled up on the keyboard of the main body device and an opening state wherein the display screen is opened for the main body device and the image display device stands on the main body device.

Incidentally, in the notebook-sized personal computer, there is something in which the back side of the display screen is supported with two or more ribs arranged in the case, and the wiring attached to the display screen or the wiring attached to the camera and the microphone, etc. disposed to surroundings of the display screen is drawn around between ribs in the back of the display screen.

However, making to a large screen has been demanded from the notebook-sized personal computer with the thin type and lightening in recent years. Therefore, the space between the surroundings edge and the back of the display screen and the case is made narrow more and more.

Then, the proposal to make the image display unit compact devising the arrangement of parts that compose the display screen and the attached wirings is performed (For instance, refer to Japanese Patent Application Publication No. 2001-249621).

However, making the space between the back of the display screen and the case narrow may bring about a possibility that wiring which is drawn around between ribs in the back of the display screen serves as a mediator that transmits the impact that the case received to the back of the display screen, so that the display is damaged.

Then, it is considered that the wiring is drawn around the space between surroundings of the display screen and the case. However, in this case, there is considered the generation of a situation that the wiring that is sure to draw around the space between surroundings and the case of the display screen turns to the back of the display screen by the vibration and the like.

The above-mentioned problem is a problem that happens similarly also in an image display device that has the display screen and an electronic apparatus.

SUMMARY OF THE INVENTION

The present invention has been made in view of the above circumstances and provides an image display device having a display screen whose thickness is reduced, and an electronic apparatus which is equipped with the image display device.

A first image display device according to the present invention includes:

a display panel having a display screen to display an image on a front surface;

a case that accommodates the display panel, the case having a standing wall section that surrounds a surroundings edge of the display panel alienating from the surroundings edge;

a cover that covers a portion between the surroundings edge of the display panel and the standing wall section of the case;

a frame having a putting section where a back surroundings edge of the display panel is placed, and an isolation section touching side of the display panel and it separates between the display panel and the standing wall section of the case; and wiring that passes between the isolation section and the standing wall section.

In the first image display device according to the present invention, the display panel and the wiring are separated by the isolation section in order to prevent the wiring from entering a space on the backside of the display panel. This makes it possible to prevent damage to the display caused when the wiring enters the space on the backside of the display panel although the wiring was initially set around the display panel.

In the first image display device according to the present invention, it is preferable that the frame has a wiring restriction section that projects from the isolation section to the standing wall section to restrict a passage of the wiring.

When such a wiring restriction section is provided, it is possible to prevent the wiring, which was once squeezed in a space between the isolation section and the standing wall section of the case, from coming back toward the front, thereby further improving assembly efficiency in the assembly process.

In the first image display device according to the present invention, it is preferable that at least a part of the putting section is shaped as convexo-concave to touch the back surroundings edge of the display panel intermittently.

When the putting section has such a shape, it is possible to protect the display panel from damage by absorbing pressure applied to the display panel.

In the first image display device according to the present invention, it is preferable that the isolation section has a first slope touching the cover, and the cover has a second slope touching the first slope.

When the isolation section and the cover have the respective slants touching each other, it is possible to disperse and thereby reduce the pressure applied to the cover.

A first electronic apparatus according to the present invention has a first case that incorporates a circuit having an arithmetic operating function, the first case having a keyboard on a top of the first case, and a second case that is connected to the first case via a hinge, the second case being openable and closable with respect to the first case, wherein:

the second case has:

a display panel having a display screen to display an image on a front surface;

a case that accommodates the display panel, the case having a standing wall section that surrounds a surroundings edge of the display panel alienating from the surroundings edge;

a cover that covers a portion between the surroundings edge of the display panel and the standing wall section of the case;

a frame having a putting section where a back surroundings edge of the display panel is placed, and an isolation section touching side of the display panel and it separates between the display panel and the standing wall section of the case; and wiring that passes between the isolation section and the standing wall section.

A second image display device according to the present invention has:

a case that accommodates a display panel, the case having a standing wall section that surrounds a surroundings edge of the display panel alienating from the surroundings edge;

a cover that covers a portion between the surroundings edge of the display panel and the standing wall section of the case, wherein the case has:

a putting section where a back edge portion of the display panel is placed; and an isolation section touching side of the display panel and it separates between the display panel and the standing wall section of the case.

In the second image display device according to the present invention, it is preferable that the image display device further has wiring that passes between the isolation section and the standing wall section.

In the second image display device according to the present invention, it is also preferable that the isolation section is arranged at same intervals as width of the display panel.

In the second image display device according to the present invention, it is also preferable that the isolation section has a wiring restriction section that projects to the standing wall section to restrict a passage of the wiring.

In the second image display device according to the present invention, it is also preferable that the putting section and the isolation section are formed in a frame having a single unitary body.

In the second image display device according to the present invention, it is also preferable that the frame is formed in another body different from the case, and is fixed on the case.

In the second image display device according to the present invention, it is also preferable that a part of the putting section is at least shaped as convexo-concave to touch the back edge portion of the display panel intermittently.

In the second image display device according to the present invention, it is also preferable that the isolation section has a first slope touching the cover, and the cover has a second slope touching the first slope.

A second electronic apparatus according to the present invention has a first case that incorporates a circuit having an arithmetic operating function, the first case having a keyboard on a top of the first case, and a second case that is connected to the first case via a hinge, the second case being openable and closable with respect to the first case, wherein the electronic apparatus has the second image display device described above.

According to the present invention described above, it is possible to provide an image display device having a display screen whose thickness is reduced, and an electronic apparatus which is equipped with the image display device.

DETAILED DESCRIPTION OF THE INVENTION

Embodiments of the present invention will be described with reference to the accompanying drawings.

Figure 1:
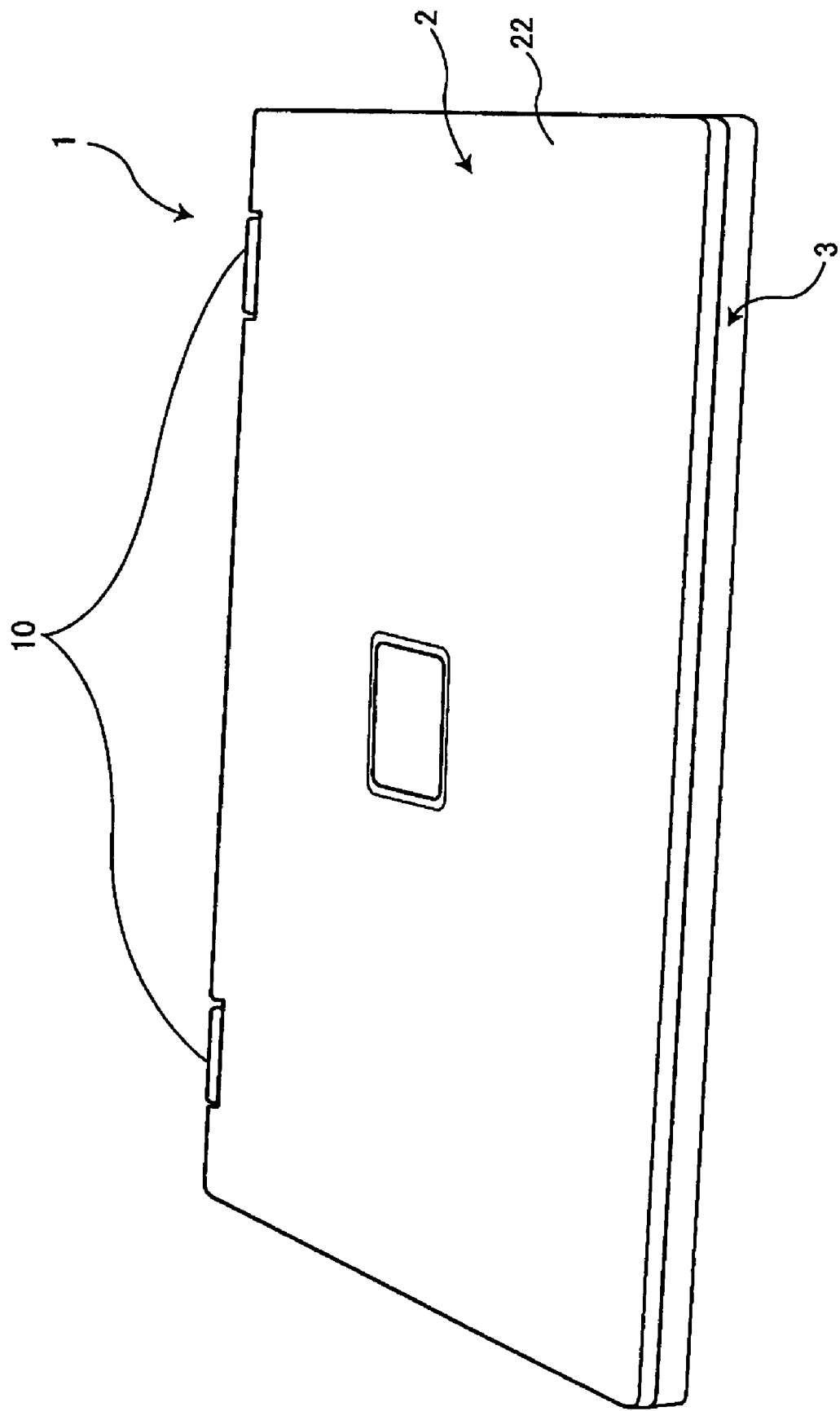
FIG. 1 is a perspective view of an electronic apparatus according to one embodiment of the present invention.
Figure 2:
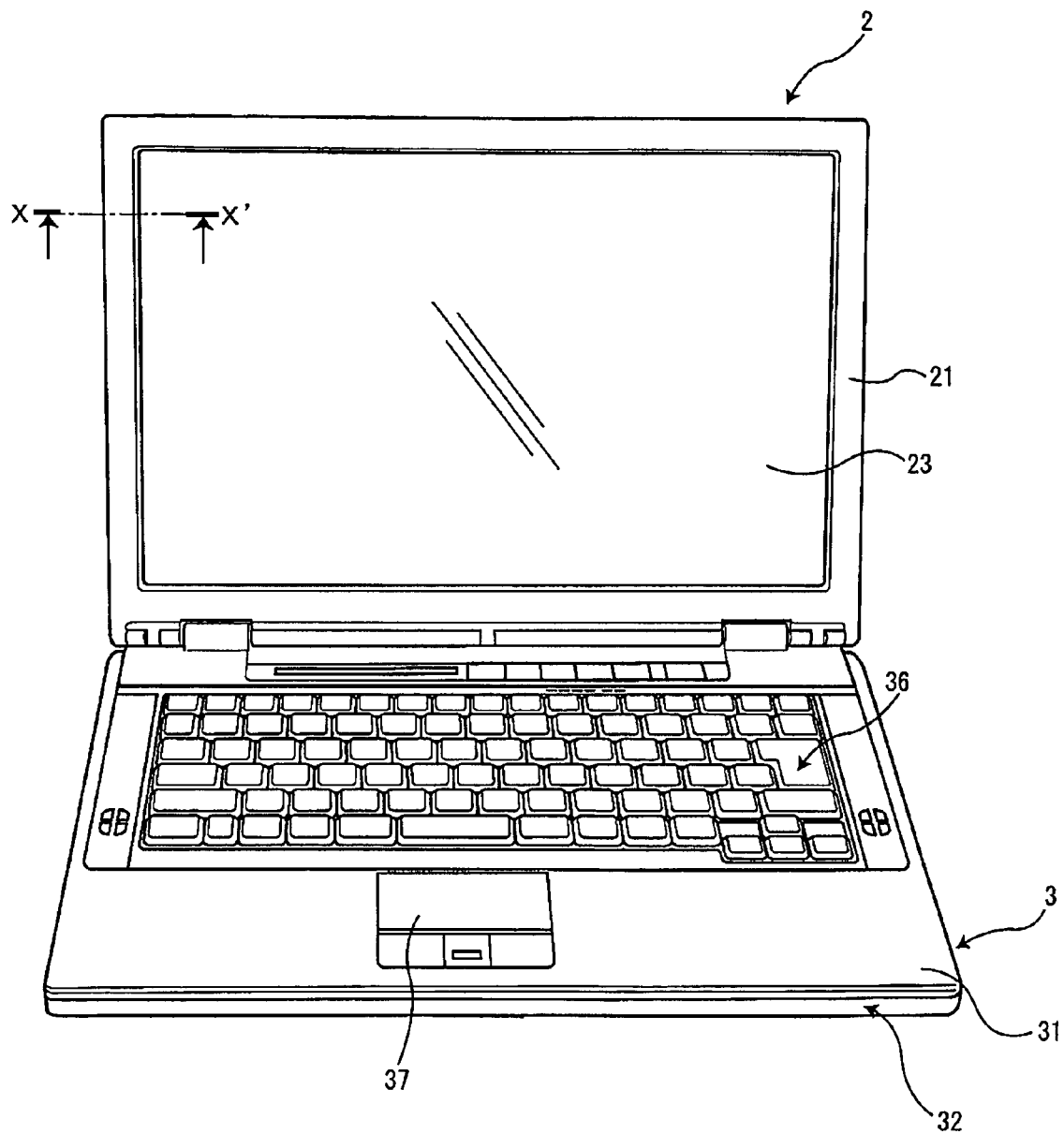
FIG. 2 is a perspective view of an electronic apparatus according to one embodiment of the present invention.

FIG. 1 and FIG. 2 are each a perspective view of an electronic apparatus according to one embodiment of the present invention.

A computer 1, which is the present embodiment, is a so-called note type of personal computer, in which an image display unit 2 that accommodates an image display device 23 for displaying an image is connected on a free basis in opening and shutting through hinge members 10 with a main unit 3 that incorporates a circuit substrate and disposes a keyboard on the upper surface.

FIG. 1 shows a state in which the image display unit 2 shuts to the main unit 3 and is piled up. FIG. 2 shows a state in which the image display unit 2 is opened for the main unit 3.

The main unit 3 shown in FIG. 1 and FIG. 2 is composed of a keyboard 36 in which two or more keys are arranged, an operation section 37 that consists of a track pad and a click button, an upper cover 31 that is built avoiding part where the keyboard 36 and the operation part 37 are set, a lower cover 32 that forms a case of the main unit 3 together with the upper cover 31, a circuit substrate equipped with CPU that executes a program, the circuit substrate being accommodated in the case, and a shield in which the circuit substrate is installed.

The image display unit 2 shown in FIG. 1 and FIG. 2 is composed of the image display device 23 for displaying an image, a frame cover 21 for covering the periphery of the image display device 23, a back cover 22 (refer to FIG. 1) for forming a case of the image display unit 2 together with the frame cover 21, and a guide frame for guiding wiring of the image display unit 2, the guide frame being accommodated in the back cover 22 and being in contact with the image display device 23. Incidentally, FIG. 1 shows the hinge members 10 through which the image display unit 2 is connected with the main unit 3 on a free basis in opening and shutting. The section X-X' shown in FIG. 2 will be described later.

Figure 3:
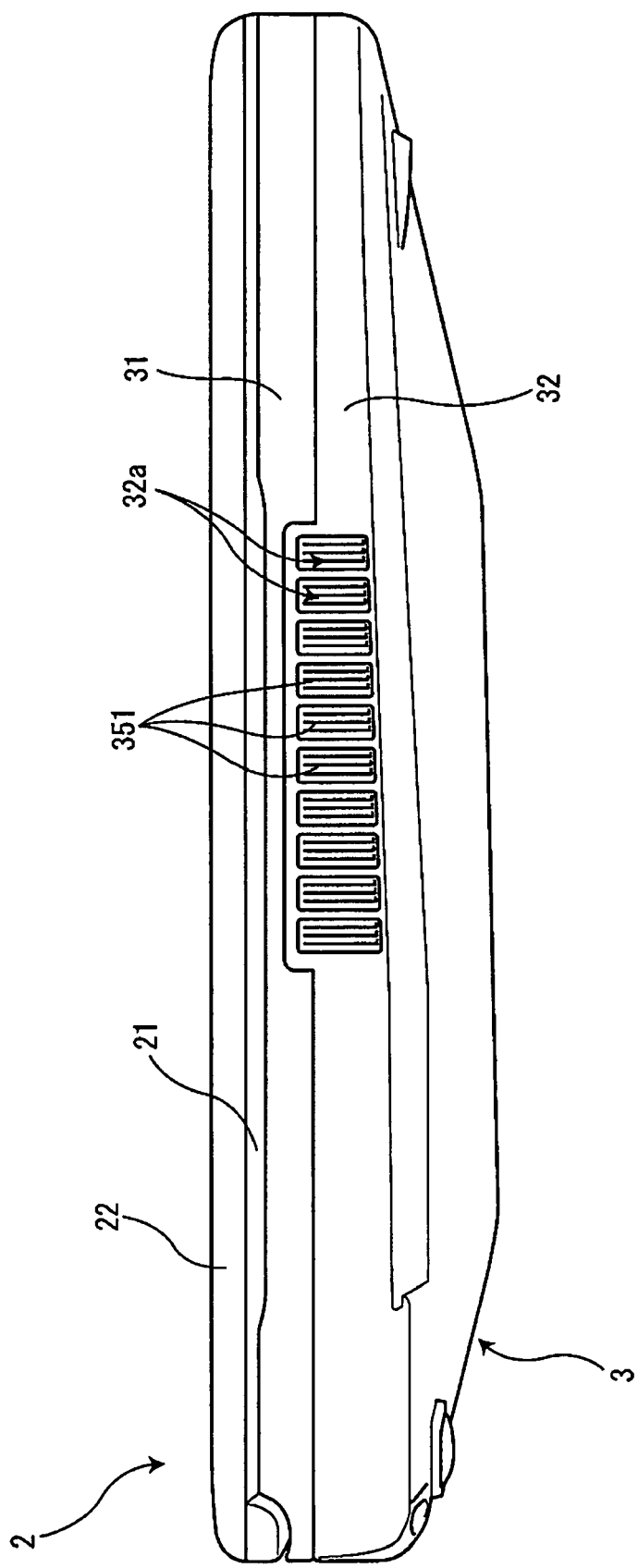
FIG. 3 is a right side view of the computer shown in FIG. 1 which is in the closed state.

FIG. 3 is a right side view of the computer shown in FIG. 1 which is in the closed state.

FIG. 3 shows a state that on a right side of the main unit 3 there are provided slits 32a for radiating heat generated from CPU loaded in the circuit substrate built into the main unit 3. Fin sections 351, which are the component of a heat radiation unit 35 that will be described later, appear from the slits 32a.

Figure 4:
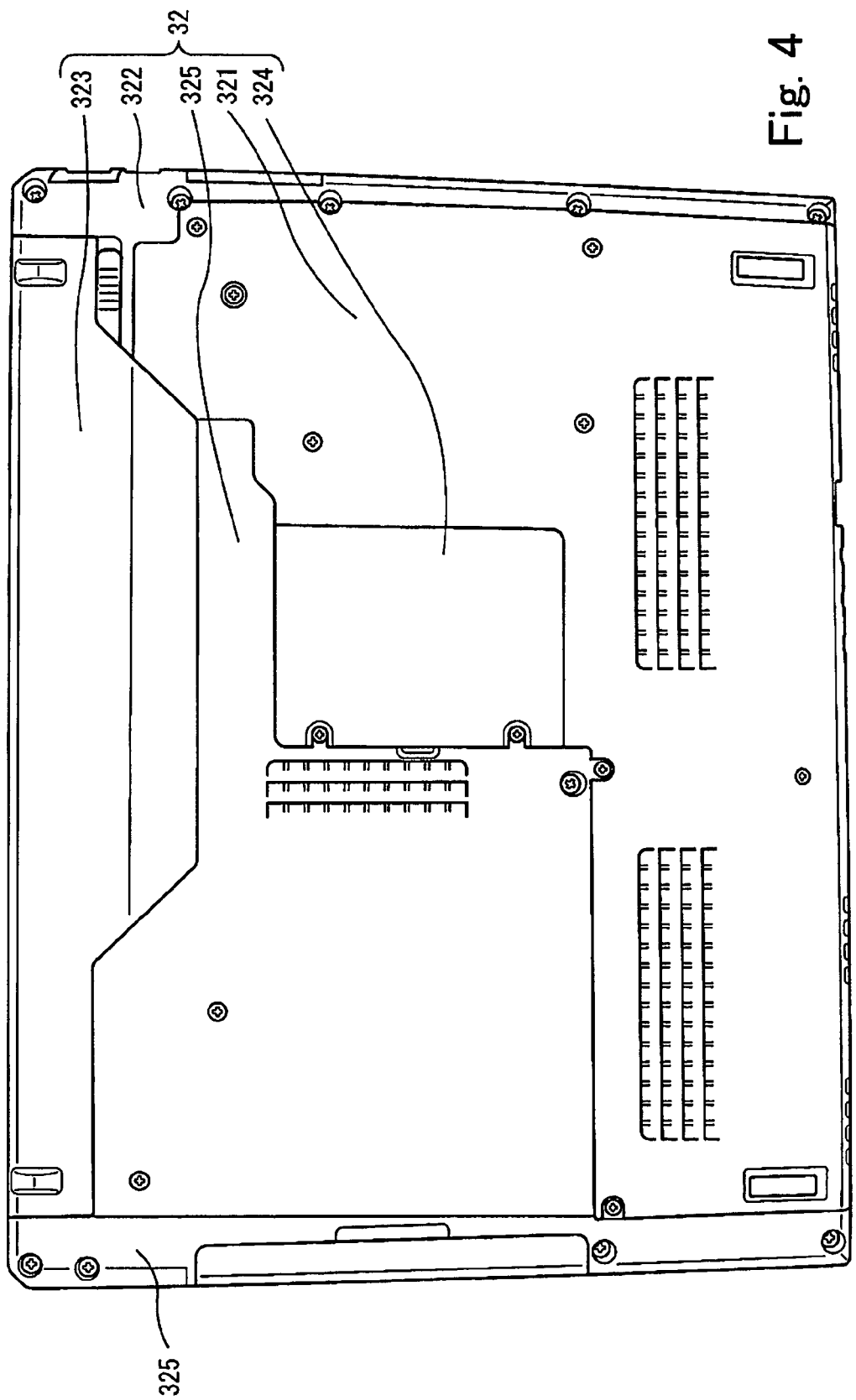
FIG. 4 is a bottom view of the computer according to the present embodiment.

FIG. 4 is a bottom view of the computer according to the present embodiment.

FIG. 4 shows the lower cover 32 that forms a case of the main unit 3 together with the upper cover 31 (refer to FIG. 2). The lower cover 32 is composed of a first panel 321, a second panel 322, a third panel 323, a fourth panel 324, and a peripheral panel 325. In the following, the first panel is typically taken up among these two or more panels and it explains.

Figure 5:
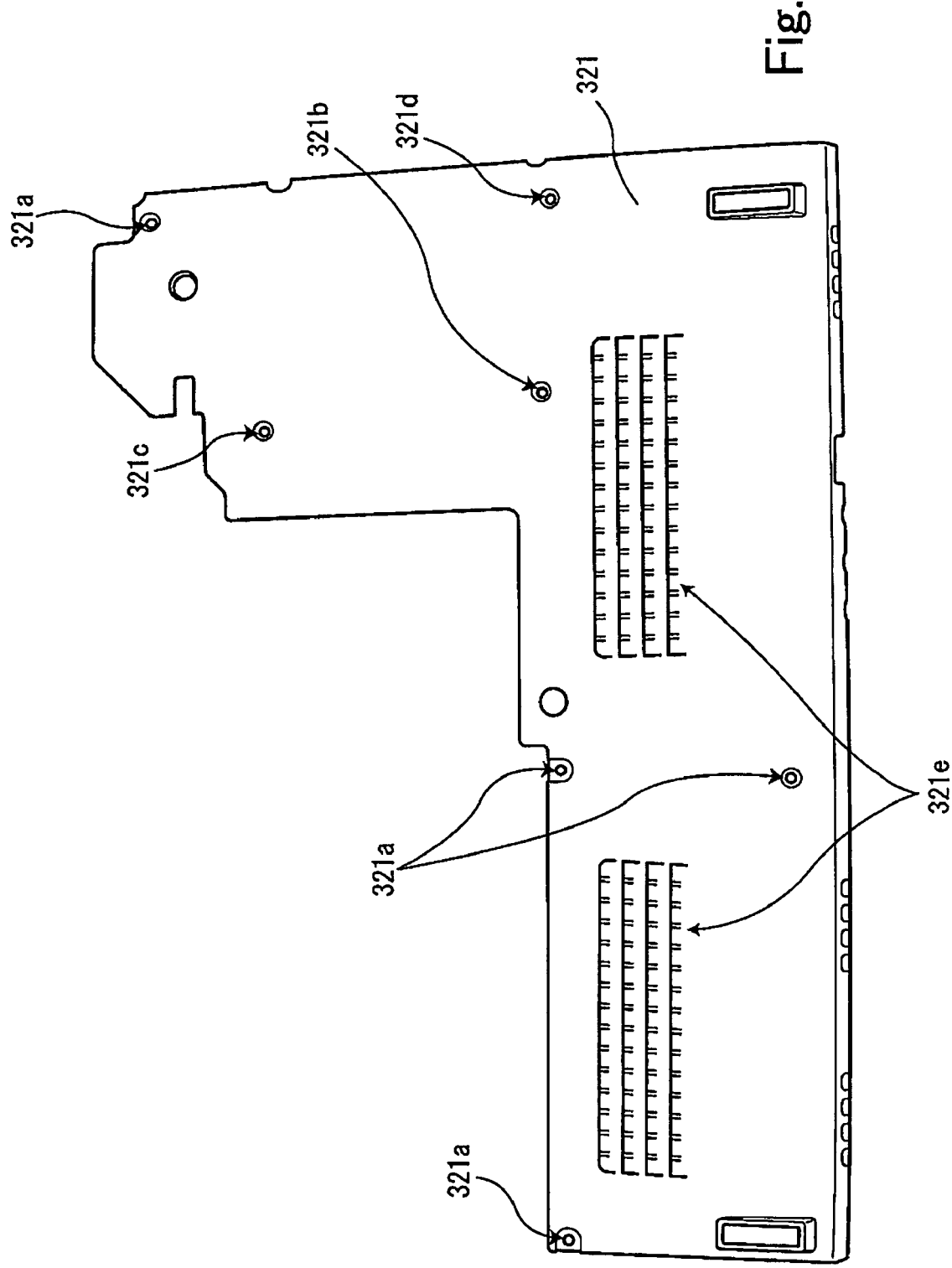
FIG. 5 is a view showing a first panel.
Figure 6:
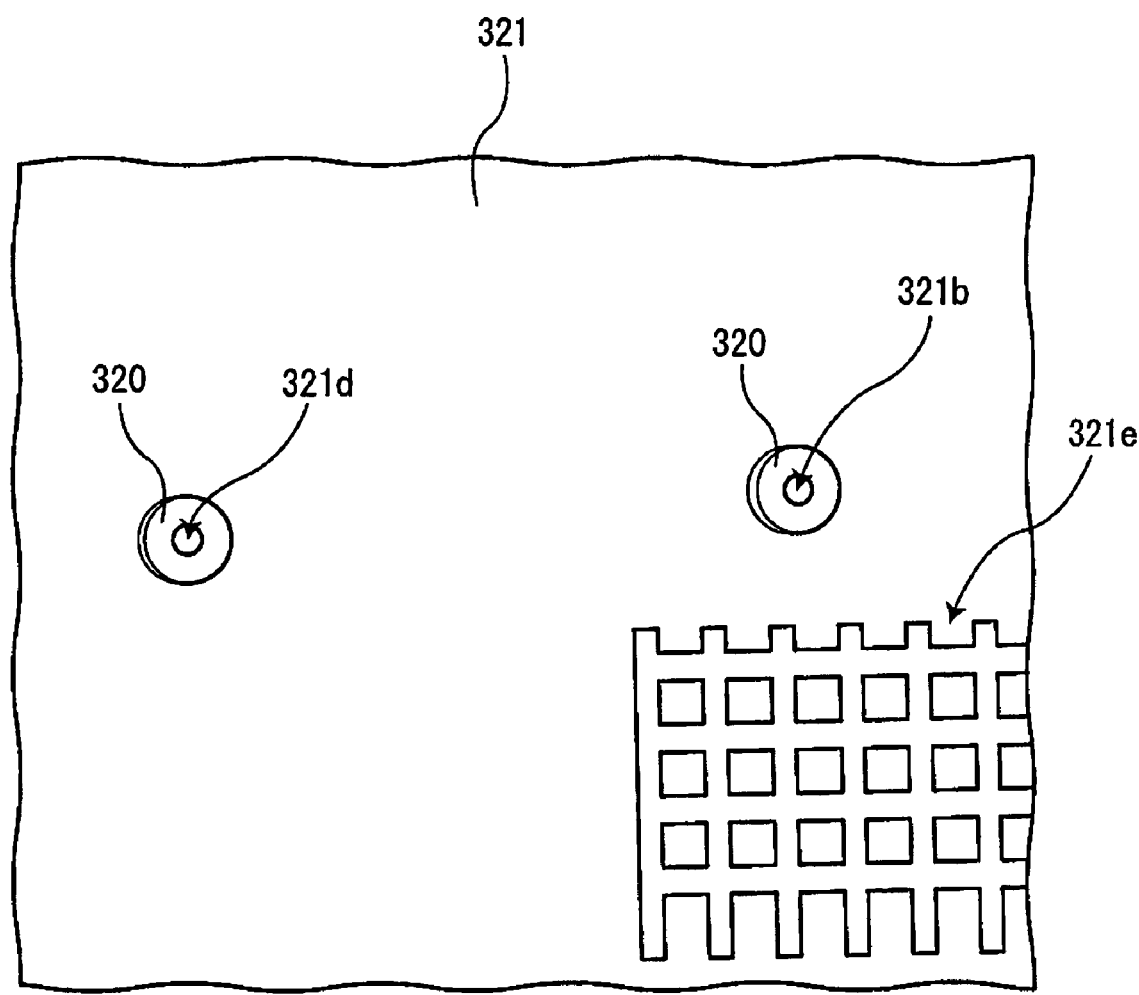
FIG. 6 is a view showing a first panel.

FIG. 5 and FIG. 6 are each a view showing the first panel. FIG. 5 shows the appearance in which the first panel 321 shown in FIG. 4 is seen from the front side. The first panel 321 is provided with slits 321e for ventilation, and screw holes 321a, 321b, 321c, and 321d to install the first panel 321 in a frame that will be described later. In the following, for the sake of convenience of the explanation, among the screw holes 321a, 321b, 321c, and 321d shown in FIG. 5, the screw hole in the vicinity of the center, the screw hole shown in the upper part in FIG. 5 of the screw hole in the vicinity of the center, and the screw hole in the right part in FIG. 5 of the screw hole in the vicinity of the center are referred to as a first screw hole 321b, a second screw hole 321c, and a third screw hole 321d, respectively.

FIG. 6 shows a part of the first panel 321 in the state that the left side of the first panel 321 shown in FIG. 5 is set up, and pushed down right, so that the first panel 321 is turned inside out. The third screw hole 321d is shown left in FIG. 6, and the first screw hole 321b is shown in right in FIG. 6.

In FIG. 6, bosses 320 are prepared for in surroundings of these the first screw hole 321b and the third screw hole 321d, respectively. Incidentally, the reason why the boss 320 is prepared for in surroundings of the screw hole is described later.

Figure 7:
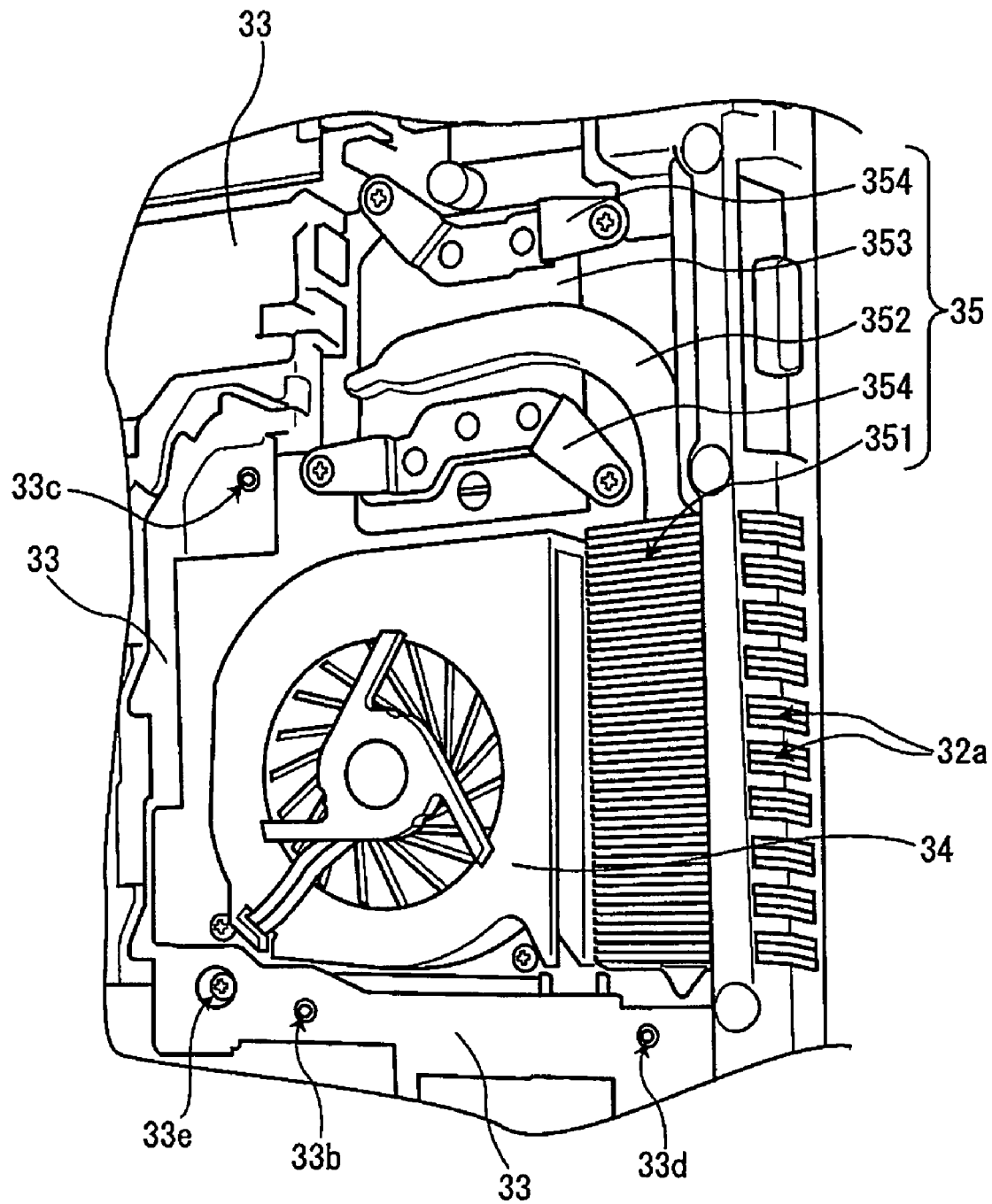
FIG. 7 is a view showing a state wherein a first panel is removed from a main unit.

FIG. 7 is a view showing a state wherein the first panel is removed from the main unit.

FIG. 7 shows a shield 33 on which a circuit substrate equipped with CPU is mounted. The shield 33 is provided with a first locking hole 33b into which a nut which is engaged with a screw on a spiral basis, the screw being inserted through the first screw hole 321b of the first panel 321 (refer to FIG. 5), is dropped, a second locking hole 33c into which a nut which is engaged with a screw on a spiral basis, the screw being inserted through the second screw hole 321c, is dropped, a third locking hole 33d into which a nut which is engaged with a screw on a spiral basis, the screw being inserted through the third screw hole 321d, is dropped, and a screw hole 33e for substrate to install a circuit substrate equipped with an electric circuit in the shield 33. The screw hole 33e for substrate to install a circuit substrate in the shield 33 is installed at the position that shifts from the first locking hole 33b.

FIG. 7 further shows a heat radiation unit 35 which is composed of an endothermic board 353, a fin section 351 consisting of two or more radiation fins, a heat transfer member 352 for transferring the heat of the endothermic board 353 through two or more radiation fins to the fin section 351, the heat transfer member 352 being installed in the endothermic board 353, and a fixing arm 354 for fixing the endothermic board 353 on the circuit substrate equipped with CPU so that the endothermic board 353 is touched to the CPU.

FIG. 7 still further shows a fan 34 that sends air to a space formed with the heat radiation fin of the heat radiation unit 35. The air sent from the fan 34 goes out of the slits 32a shown in FIG. 3 too outside the case depriving of the heat that had conducted to the fin section 351 when passing through the space formed with the heat radiation fin.

Here, there will be explained in detail the fin section 351 of the heat radiation unit 35 prepared for in the computer 1 according to the present embodiment.

Figure 8:
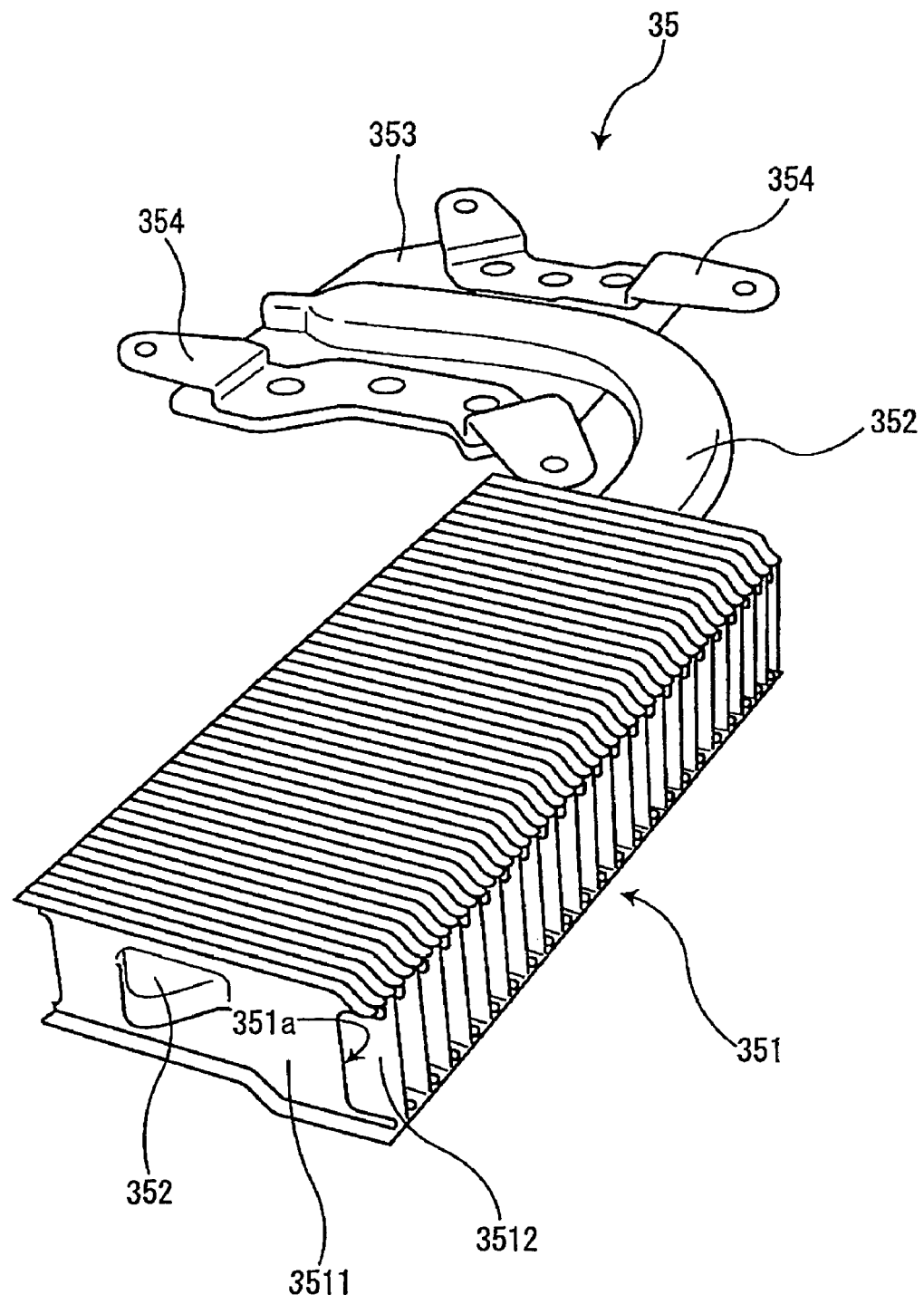
FIG. 8 is a perspective view of a fin section.

FIG. 8 is a perspective view of a fin section.

FIG. 8 shows the fin section 351 penetrated with the heat transfer member 352, which is turned the side where air from the fan 34 flows out to the right of FIG. 8.

The fin section 351 shown in FIG. 8 is one in which first fins 3511 each having a notch 351a on the center portion of the air outflow side edge, and second fins 3512 each free from notch 351a, are alternately arranged.

According to the present embodiment, the first fins 3511 and the second fins 3512 are alternately arranged with spaces so as to spread width on the air outflow side. As a result, it is possible to reduce the collision of the edge of the first fins 3511 with air as compared with a case where only the second fins 3512 having no notch 351a are arranged similarly. Therefore, according to the present embodiment, the preparation of the notches 351a of the first fins 3511 on the edge portion makes it possible to suppress the noise without so much decreasing the heat radiation function.

Incidentally, according to the present embodiment, the conduction of heat to the fin section 351 is performed through the endothermic board 353 and the heat transfer member 352. However, it is acceptable that the fin section 351 is disposed on CPU as not shown in the figure without the endothermic board 353 and the heat transfer member 352. Alternatively, it is acceptable that neither the first fin 3511 nor the second fin 3512 are alternately arranged, but they are arranged calculatedly in such a way that the first one fin 3511 enters when the second two fins 3512 are consecutive.

Figure 9:
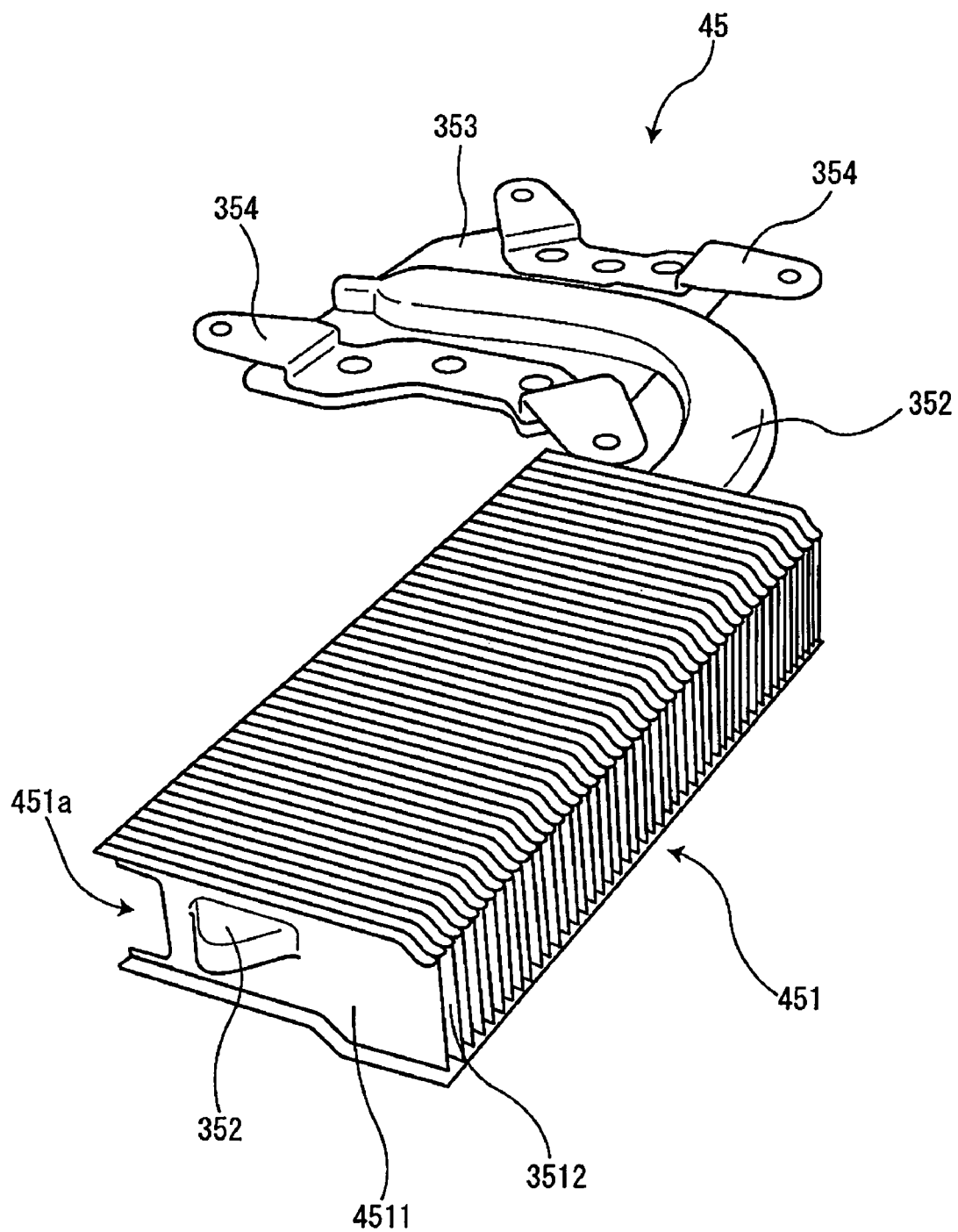
FIG. 9 is a perspective view of a fin section.
Figure 10:
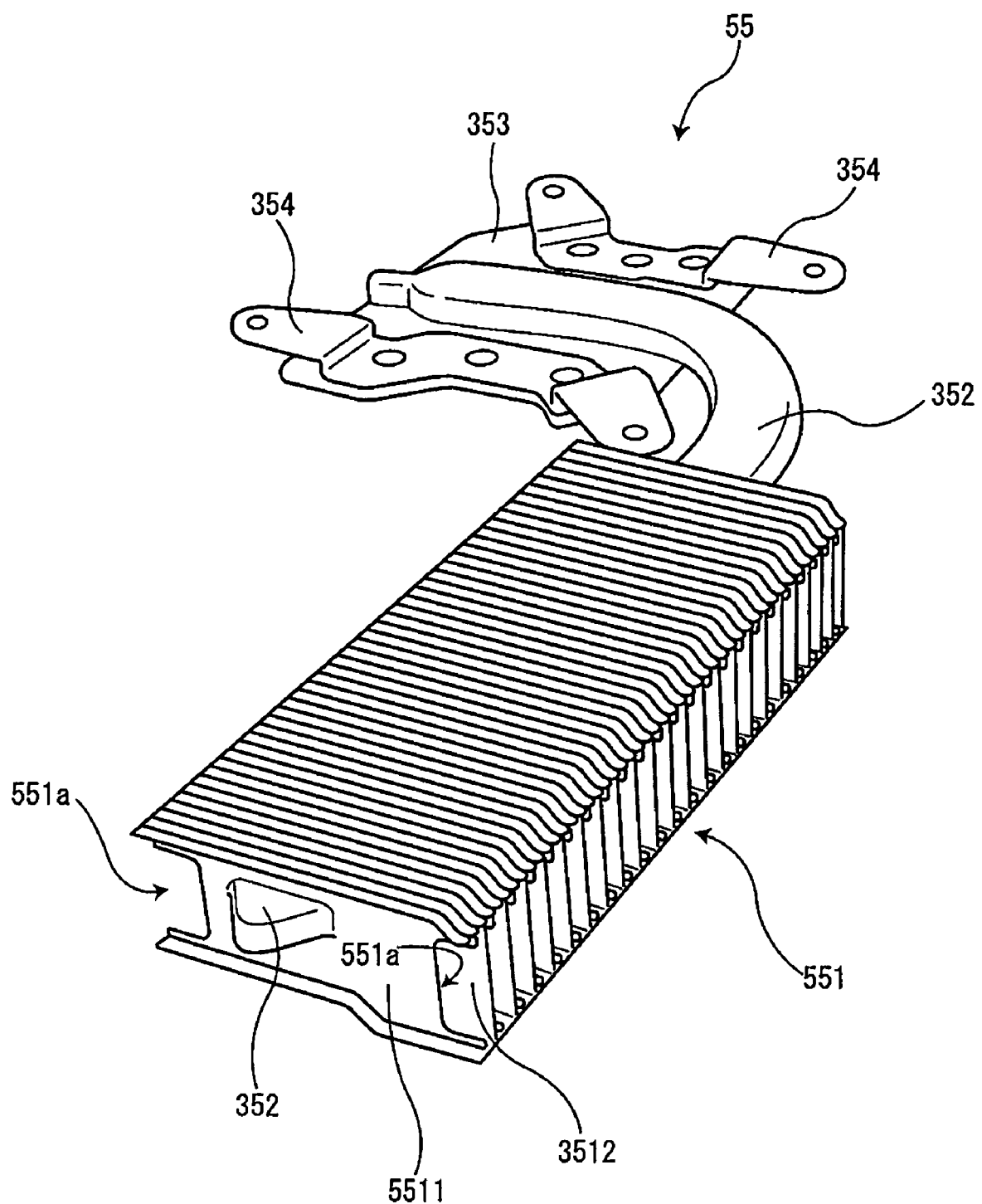
FIG. 10 is a perspective view of a fin section.

FIG. 9 and FIG. 10 are each a perspective view of a fin section.

FIG. 9 shows a heat radiation unit 45 having a fin section 451 wherein same notches 451a as the notches 351a explained in FIG. 8, are prepared only at the side where air of the first fin 4511 flows in, which is different from the fin section 351 shown in FIG. 8. In this way, preparation of the notches 451a only at the side where air flows in also makes it possible to suppress the noise without so much decreasing the heat radiation function.

FIG. 10 shows a heat radiation unit 55 having a fin section 551 wherein same notches 551a as the notches 351a explained in FIG. 8, are prepared at both the side where air of the first fin 5511 flows in and the side where the air flows out. In this way, preparation of the notches 551a at both the side where air flows in and the side where air flows out makes it possible to further suppress the noise without so much decreasing the heat radiation function.

Next, there will be explained the first locking hole 33b, the second locking hole 33c, the third locking hole 33d, and the screw hole 33e for substrate.

Figure 11:
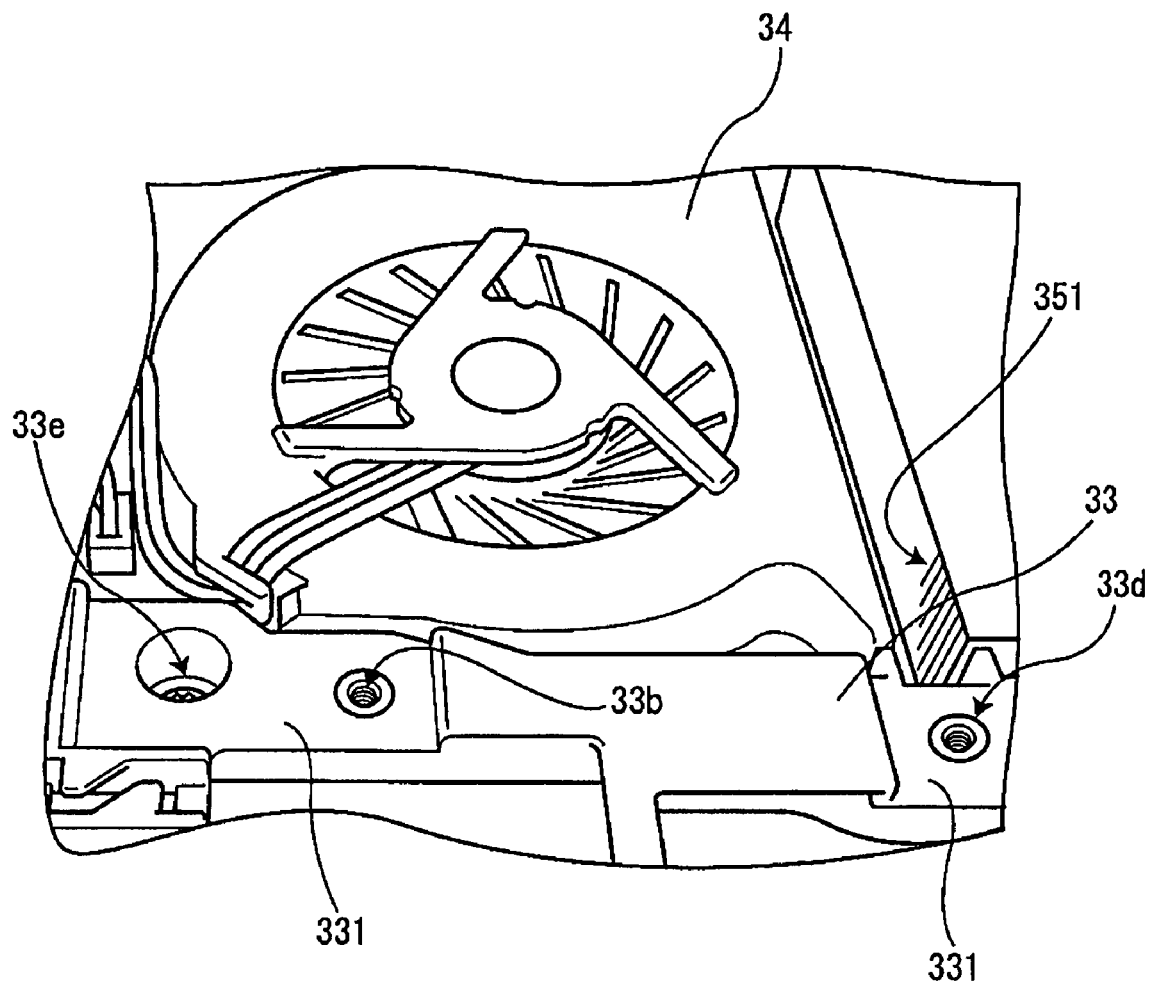
FIG. 11 is a partially enlarged view of the frame shown in FIG. 7.
Figure 12:
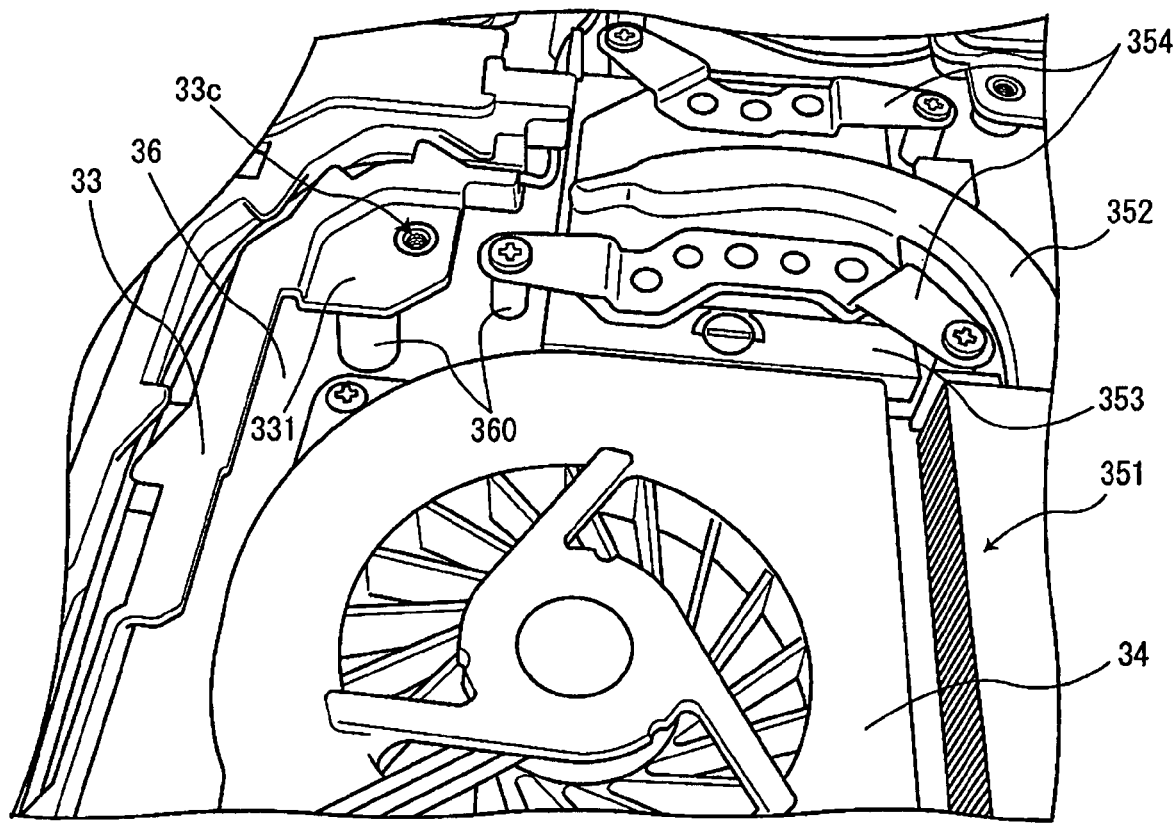
FIG. 12 is a partially enlarged view of the frame shown in FIG. 7.

FIG. 11 and FIG. 12 are each a partially enlarged view of the frame shown in FIG. 7.

FIG. 11 shows the appearance in which the first locking hole 33b, the third locking hole 33d, and the screw hole 33e for substrate are prepared for in a thin thickness area 331 where it is dropped in by one step so that the thickness is thinned more than other areas, of the shield 33.

FIG. 12 shows the appearance in which a circuit substrate 36 equipped with CPU (not illustrated) that comes in contact with the endothermic board 353 is screwed to the thin thickness area 331 of the shield 33 through spacers 360. Also here, a position where the circuit substrate 36 is screwed to the shield 33 shifts from a position of the second locking hole 33c where the first panel 321 is screwed to the shield 33.

FIG. 12 further shows the appearance in which the fixing arm 354 is screwed to the circuit substrate 36 through the spacers 360. Incidentally, the first screw hole 321b on the back of the first panel 321, and the boss 320 provided on the periphery of the third screw hole 321d, which are shown in FIG. 6, are for providing an offset for a difference of the groove formed with the thin thickness area 331 of the shield 33 and other areas so that the first panel 321 should not crack when tightening up a screw.

According to the present embodiment, the circuit substrate 36 and the first panel 321 are coupled with one another at positions which are different with respect to the shield 33. Therefore, the impact to the first panel 321 is simply transmitted to the circuit substrate 36 only indirectly through the shield 33. Thus, according to the present embodiment, it is possible to suppress the impact that the circuit substrate 36 receives as compared with the case where the circuit substrate 36 and the first panel 321 are screwed together in the same part with respect to the shield 33.

Further, according to the present embodiment, the thin thickness area 331 thins in its thickness through drop-in by one step from a surrounding area that is adjacent to the thin thickness area 331. Therefore, the thin thickness area 331 of the shield 33 and the surrounding area serve as a damper, and thus it is possible to attenuate with the shield 33 the impact that the first panel 321 receives. As a result, the impact transmitted to the circuit substrate 36 through the shield 33 can be softened further more.

Next, there will be explained the structure of the image display unit 2 in detail.

Figure 13:
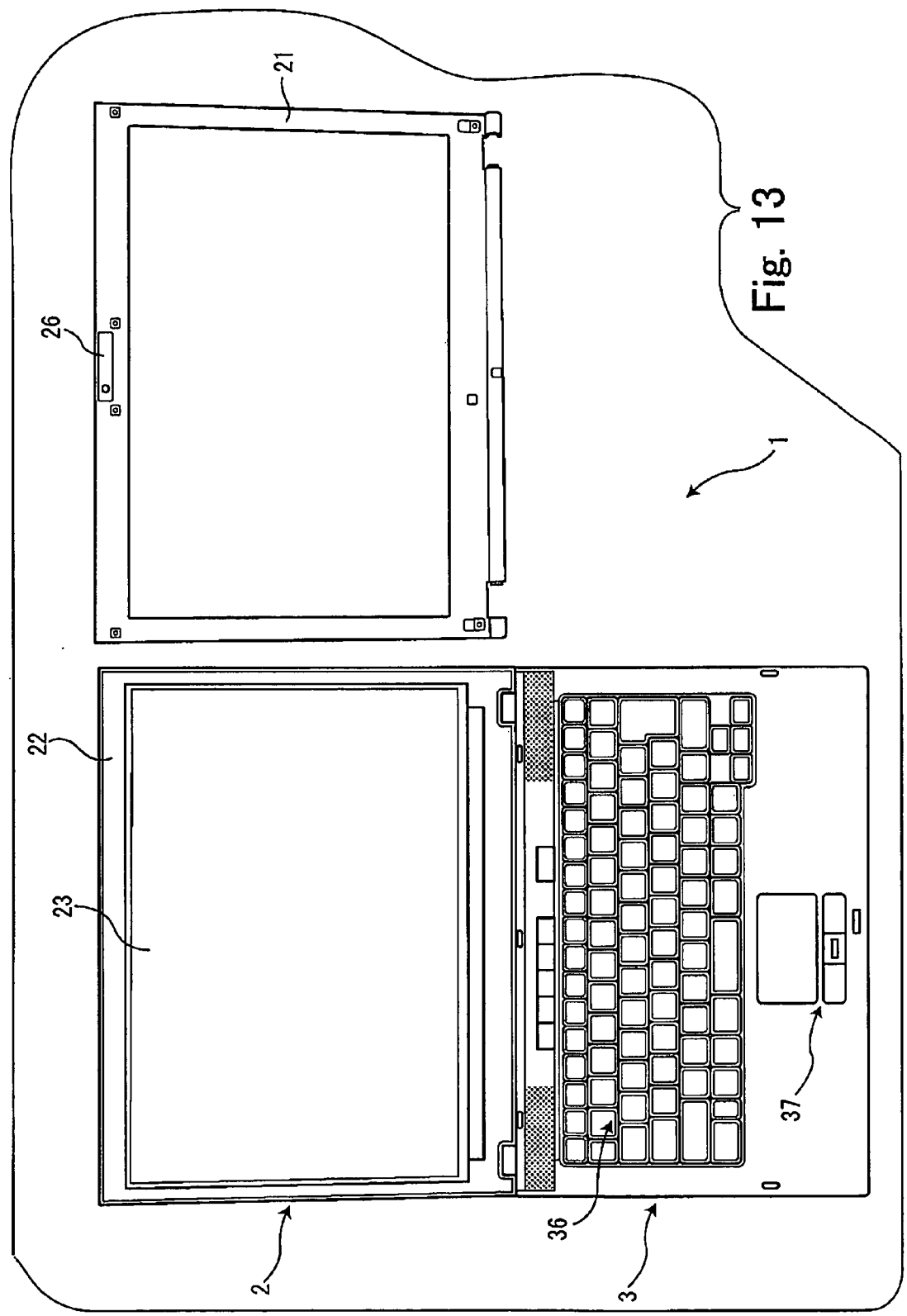
FIG. 13 is a view showing a computer wherein a frame cover of an image display unit is removed.

FIG. 13 is a view showing a computer wherein a frame cover of the image display unit is removed.

FIG. 13 shows the computer 1 wherein the frame cover 21, which covers the front surroundings edge of the image display device 23, is removed, and the frame cover 21. Here, there is shown the appearance in which the whole image display device 23 accommodated by the back cover 22 that forms the case of the image display unit 2 with the frame cover 21 is exposed by detaching the frame cover 21. While the illustration is omitted in FIG. 13, actually, the camera unit, the mike unit, and the wiring etc. attached to these are furthermore disposed to surroundings of the image display device 23. Moreover, though in the frame cover 21 shown in FIG. 13, there is a part where acrylic board 26 is set in part, this is described later.

Figure 14:
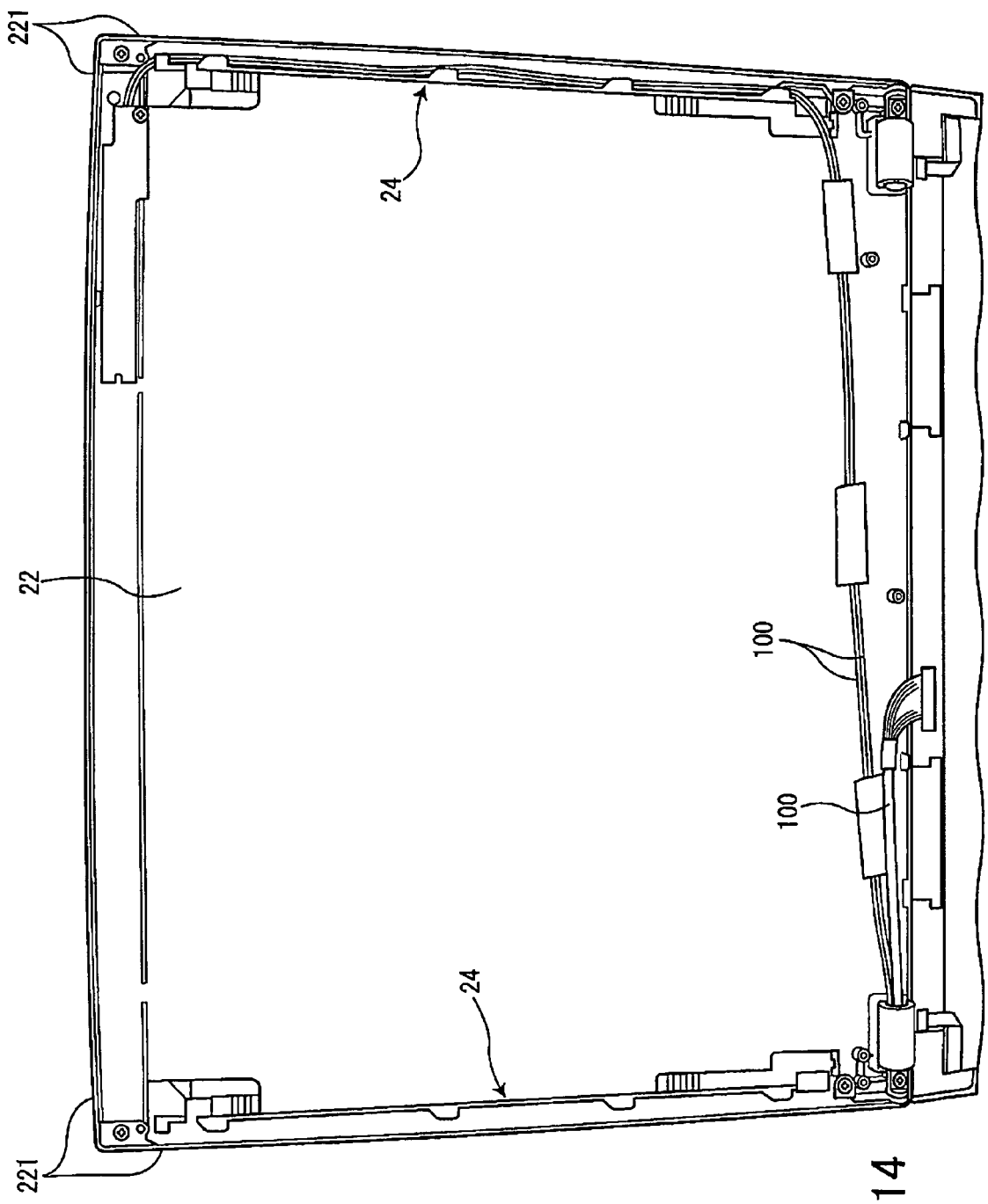
FIG. 14 is a view showing the inside of a back cover.

FIG. 14 is a view showing the inside of the back cover.

FIG. 14 shows the appearance in which the image display device 23 is detached from the image display unit 2 in the state shown in FIG. 13, and the inside of the back cover 22 is exposed. Here, there is shown the appearance in which guide frames 24 that are vertically extended are installed at right and left both ends in the back cover 22, respectively.

The guide frames 24 are installed in the inside of the back cover 22 at intervals from standing walls 221 prepared for in surroundings of the back cover 22. The image display device 23 is set between these two guide frames 24.

FIG. 14 further shows the appearance in which a wiring 100 passes through between the guide frame 24 shown at the right side in FIG. 14 and the standing wall 221 of the back cover 22. Incidentally, actually, the wiring 100 passes through between the guide frame 24 shown at the left side in FIG. 14 and the standing wall 221 of the back cover 22. This is omitted in illustration.

Figure 15:
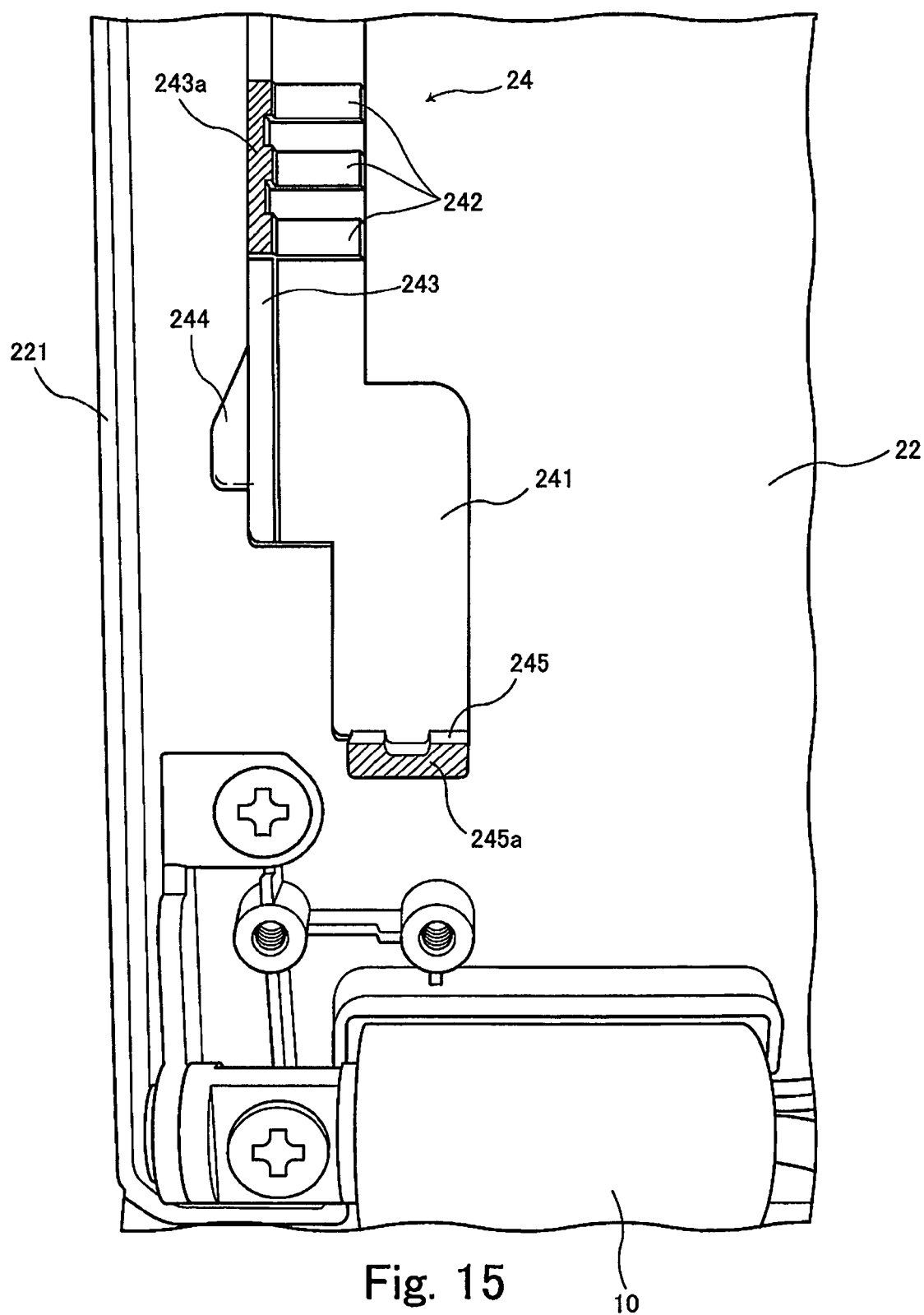
FIG. 15 is an enlarged view of a guide frame.
Figure 16:
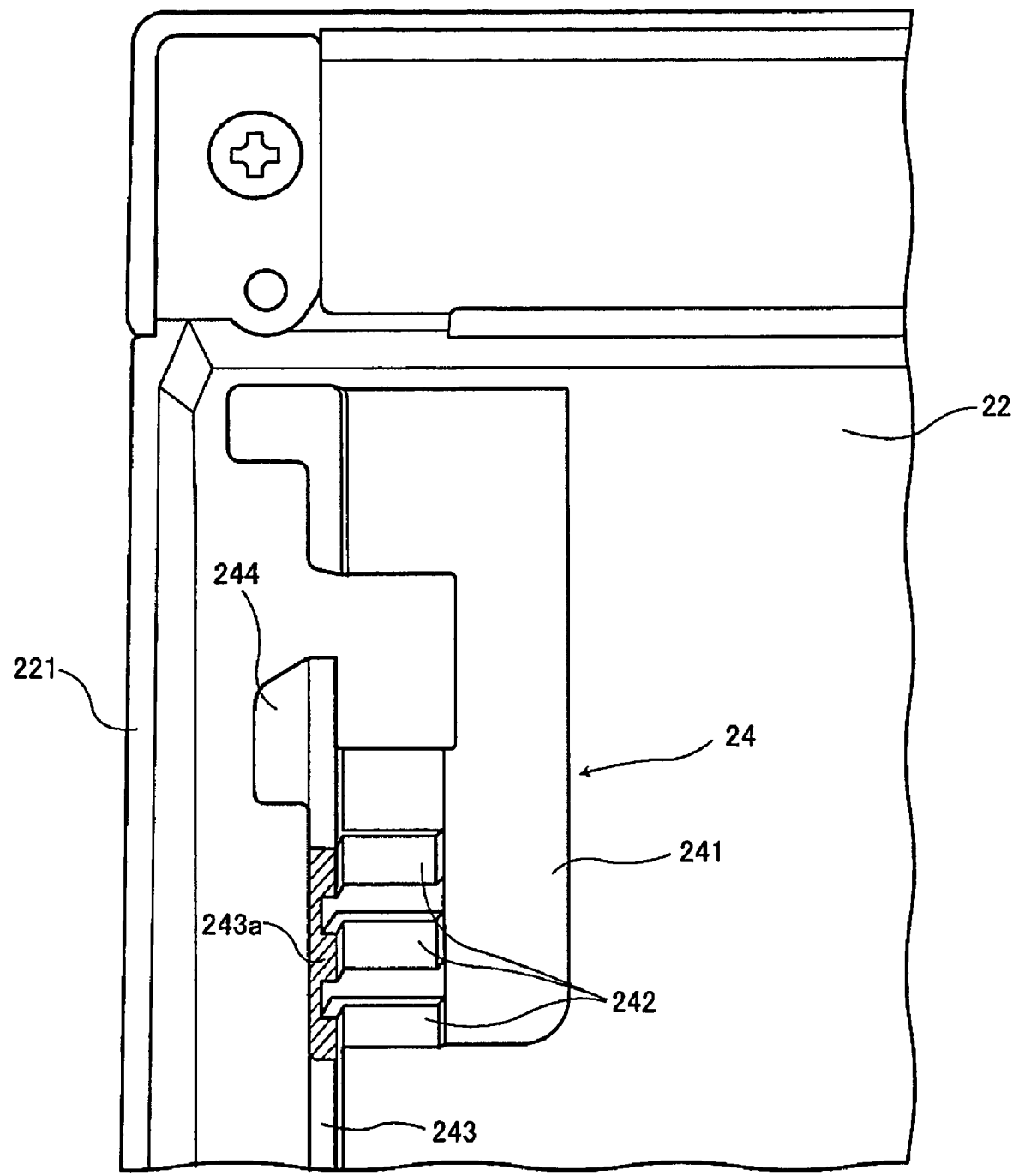
FIG. 16 is an enlarged view of a guide frame.

FIG. 15 and FIG. 16 are each an enlarged view of a guide frame.

FIG. 15 shows an enlarged view of the edge shown under FIG. 14, of the guide frame 24 shown left in FIG. 14, and also shows a hinge member 10.

The guide frames 24 is composed of a base section 241 as a base, a convexo-concave touching section 242 which touches the back surroundings edge (back edge part) of the image display device 23 prepared for on the base section 241, and an isolation section 243 for separating the image display device 23 which the touching part 242 touches and the wiring 100, the isolation section 243 being established on the base section 241. The guide frame 24 is formed with an elastomer and fixed to the back cover 22 by a prescribed bonding means. The double-faced tape and the adhesive can be adopted as the bonding means. Incidentally, it is acceptable that the guide frame 24 is composed of another part which is different from the back cover 22 as in the present embodiment; alternatively, it is acceptable that the guide frame 24 is formed in a united body with the back cover 22.

In the image display unit 2, the isolation section 243 of the guide frame 24 separates the image display device 23 and the wiring 100. Thus, according to the image display unit 2, the wiring 100 is prevented from going into the space between the back of the image display device 23 accommodated by the back cover 22 and the back cover 22. Therefore, according to the present embodiment, it is possible to prevent damage of the image display device 23 caused by the effect that the impact onto the back cover 22 is transferred to the image display device 23 through the wiring 100 which goes into the space between the back of the image display device 23 and the back cover 22.

According to the present embodiment, it is possible to absorb the pressure that applies to the image display device 23 when the touching section 242 of the guide frame 24 is shaped as a convexo-concave.

FIG. 15 further shows a wiring restriction section 244 that is one of components of the guide frame 24. The wiring restriction section 244 provides such a restriction that the wiring, which is taken to pass between the isolation section 243 and the standing wall 221 of the back cover 22, should not float. This feature makes it possible to prevent the wiring 100 pushed between the isolation section 243 and the standing wall 221 once from returning to this side, and thus it is possible to contribute to the improvement of the assembly efficiency in the assembly process.

Moreover, FIG. 15 shows the appearance in which a slope 243a is formed on the point of the part that is adjacent to the touching section 242, of the isolation section 243, and in addition a slope 245a is formed on the tip of a raising section 245 established at the bottom of the base 241. Incidentally, the slopes 243a and 245a are shown in the slash in FIG. 15. While details are described later, slopes which touch the slopes 243a and 245a, respectively, are prepared for at the position corresponding to the slope 243a and 245a on the other side of the frame cover 21.

FIG. 16 shows the enlarged view of the edge on the other side which is opposite to the edge shown in FIG. 15, of the guide frame 24 shown at the left of FIG. 14.

FIG. 16 also shows the appearance in which the slope 243a is formed on the point of the isolation section 243 that is adjacent to the touching section 242. In FIG. 16, the slope 243a is shown in the slash. Incidentally, a slope which touches the slope 243a is prepared for on the other side of the frame cover 21.

Figure 17:
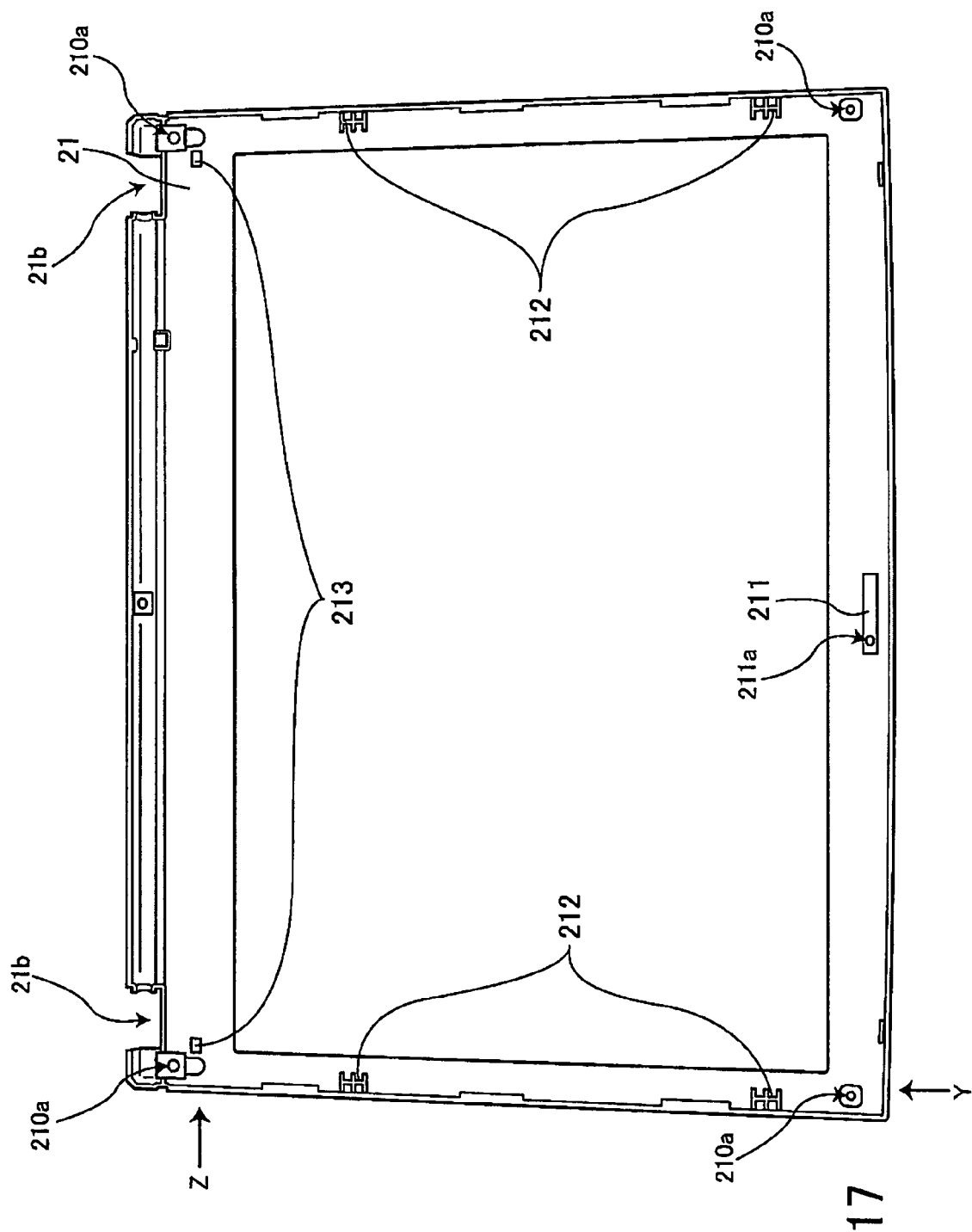
FIG. 17 is a perspective view of the backside of a frame cover.

FIG. 17 is a perspective view of the backside of a frame cover.

FIG. 17 shows a part of the frame cover 21 of FIG. 13 in the state that the upper part in FIG. 13 is set up forward and turned over. In the upper part in FIG. 17 there is shown notches 21b installed to evade the hinge members 10.

Further, FIG. 17 shows first convex sections 212 prepared for on the parts corresponding to the touching sections 242 shown in FIG. 15 and FIG. 16, respectively, on the other side of the frame cover 21, and second convex sections 213 prepared for on the part corresponding to the raising section 245 shown in FIG. 15, respectively, on the other side of the frame cover 21.

In addition, FIG. 17 shows a concave section 211 which is depressed by one step when seeing from the surface of the frame cover 21, that is, which offers upheaval to this side in FIG. 17 at the center of the other side opposite to the side where the notches 21b are installed, on the other side of the frame cover 21. The concave section 211 is provided with a hole 211a into which the tip of the miniature camera described later is inserted. Incidentally, the part of the guide frame 24 shown in FIG. 15 and FIG. 16 is covered with the left side of the frame cover 21 shown in FIG. 17. FIG. 17 further shows screw holes 210a for installing the frame cover 21 in the back cover 22.

Figure 18:
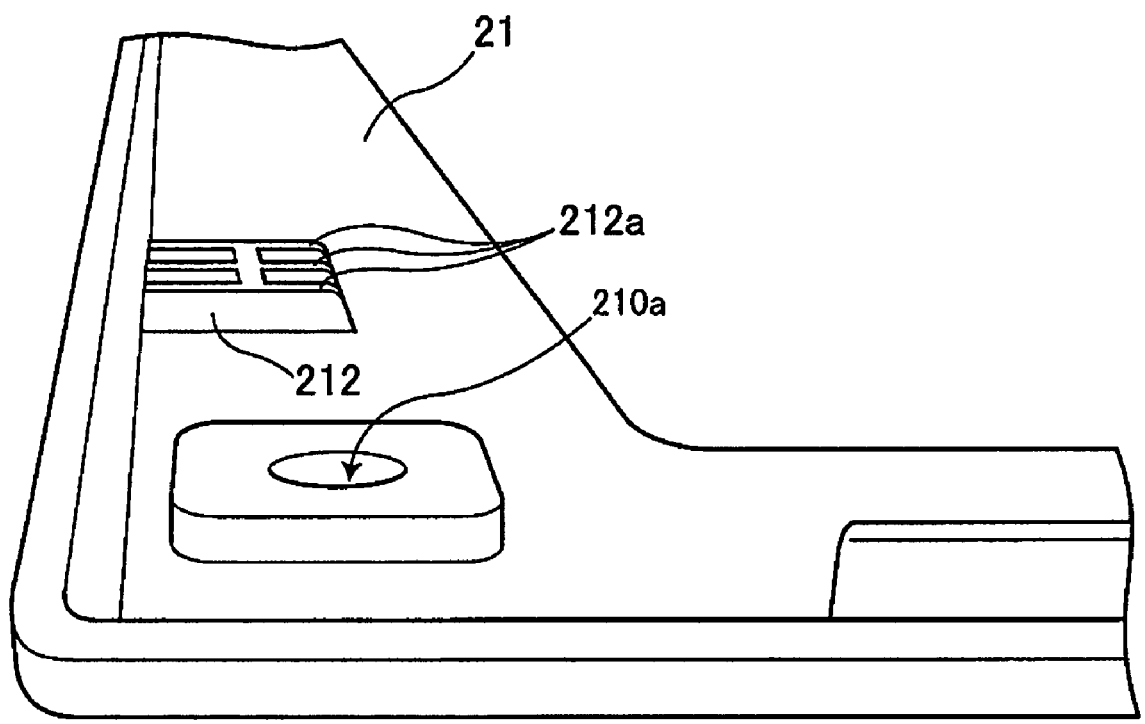
FIG. 18 is a partially enlarged view of the backside of a frame cover.
Figure 19:
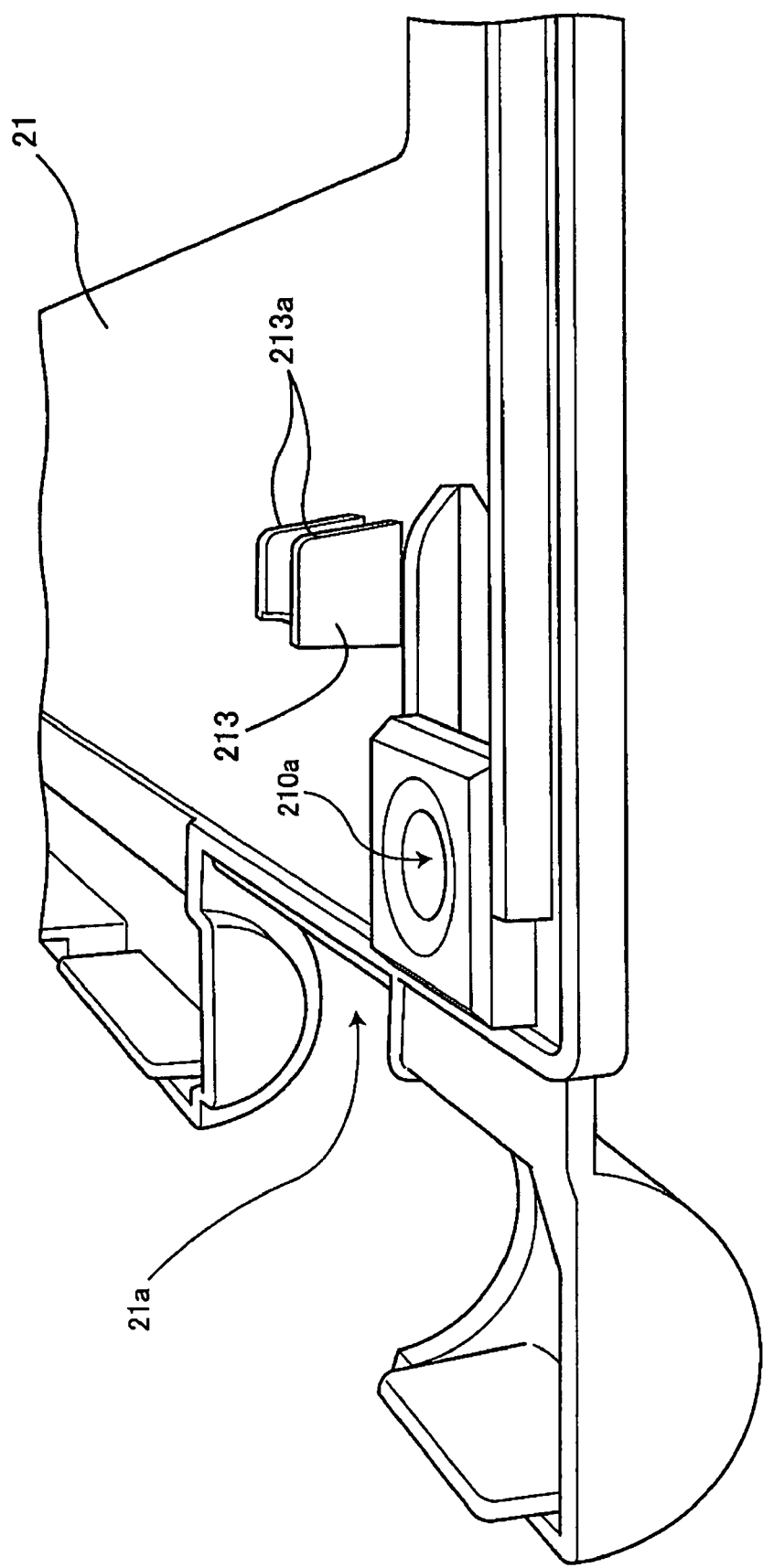
FIG. 19 is a partially enlarged view of the backside of a frame cover.

FIG. 18 is a partially enlarged view of the backside of a frame cover. FIG. 19 is a partially enlarged view of the backside of a frame cover.

FIG. 18 shows the appearance in which the frame cover 21 shown in FIG. 17 is seen in the direction of the arrow Y that is shown in FIG. 17. Here, there is shown the first convex section 212 that has slopes 212a each touching the slope 243a shown in FIG. 16.

FIG. 19 shows the appearance in which the frame cover 21 shown in FIG. 17 is seen in the direction of the arrow Z that is shown in FIG. 17. Here, there is shown the second convex section 213 that has slopes 213a each touching the slope 245a shown in FIG. 15.

Figure 20:
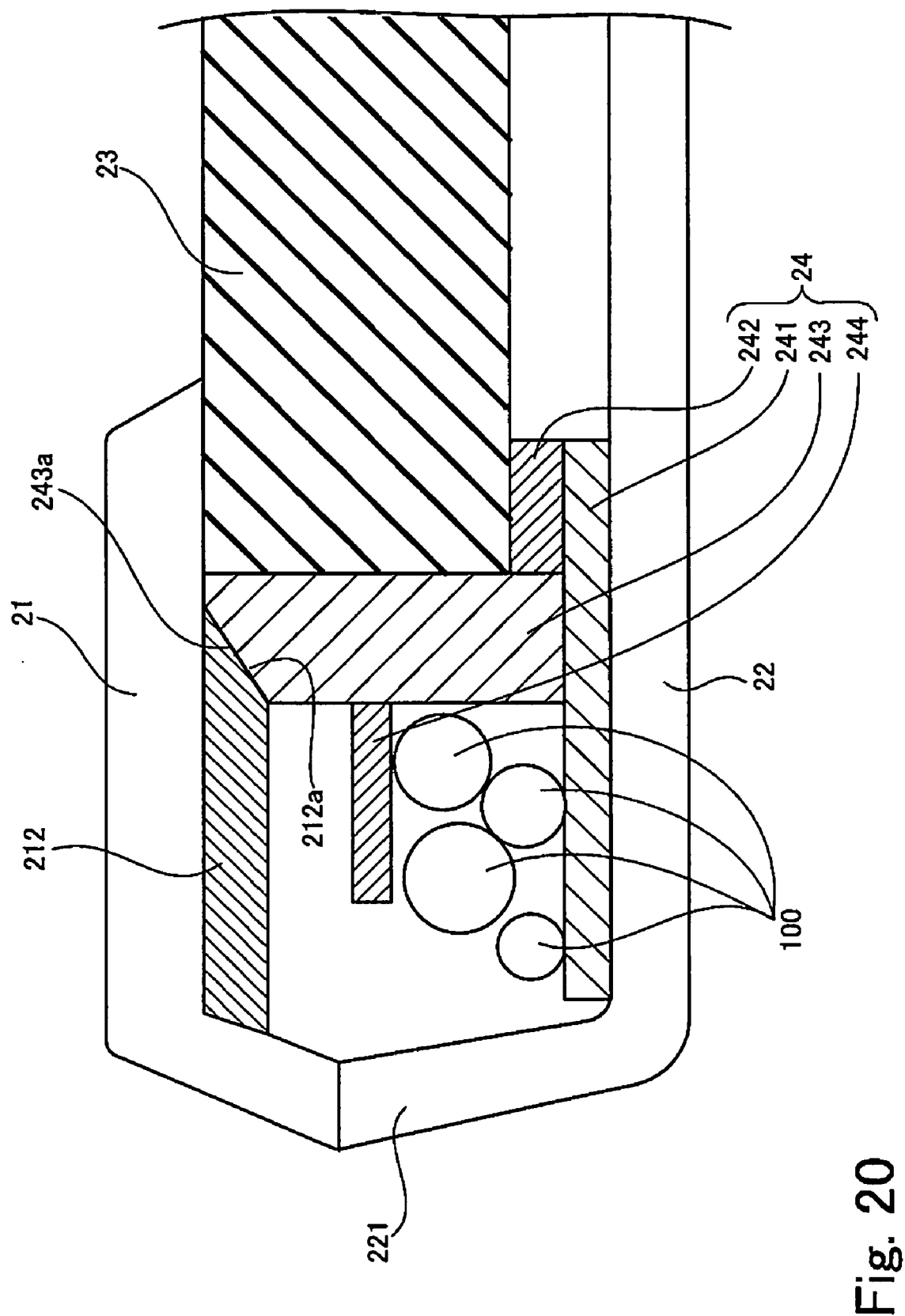
FIG. 20 is a sectional view taken along the line X-X' of FIG. 2.

FIG. 20 is a sectional view taken along the line X-X' of FIG. 2.

FIG. 20 shows the appearance in which the slope 212a of the first convex section 212 shown in FIG. 18 comes in contact with the slope 243a of the isolation section 243 shown in FIG. 16.

FIG. 20 further shows the appearance in which the touching section 242 of the guide frame 24 touches the back surroundings edge of the image display device 23, and the isolation section 243, which is established on the base section 241, separates the wiring 100 and the image display device 23.

FIG. 20 furthermore shows the appearance in which the wiring restriction section 244 projects from the isolation section 243 to the standing wall 221 of the back cover 22.

According to the present embodiment, the slope 243a of the isolation section 243 comes in contact with the first convex section 212 of the frame cover 21, and the slope 245a of the raising section 245 comes in contact with the second convex sections 213 of the frame cover 21. This feature makes it possible to distribute the pressure that applies to the frame cover 21, so that the pressure that reaches the image display device 23 can be weakened.

Figure 21:
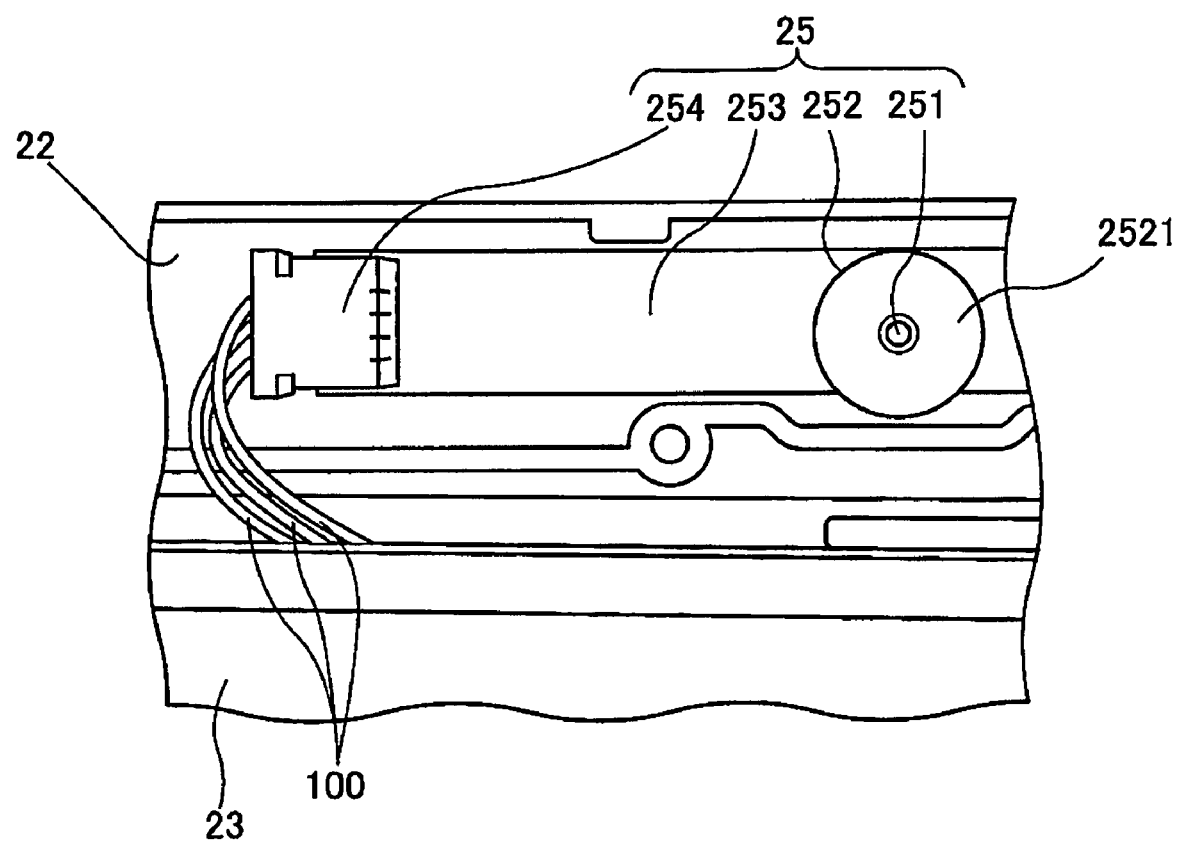
FIG. 21 is a view of a camera unit which is incorporated in an image display unit.

FIG. 21 is a view of a camera unit which is incorporated in an image display unit.

FIG. 21 shows a camera unit 25, which is disposed to surroundings where the image display device 23 is avoided, in the back cover 22. The camera unit 25 is composed of an image taking lens 251, a barrel 252 of which the image taking lens 251 is set to the front, the barrel 252 incorporating therein an image sensor (not illustrated) on which the subject light passed through the image taking lens 251 is image-formed, a circuit substrate 253 that is loaded with electronic circuits for processing an image signal outputted from the image sensor, and a connector for coupling the circuit substrate 253 and the wiring 100. Incidentally, the front 2521 of the barrel 252, to which the image taking lens 251 is set, is smoothly formed.

Figure 22:
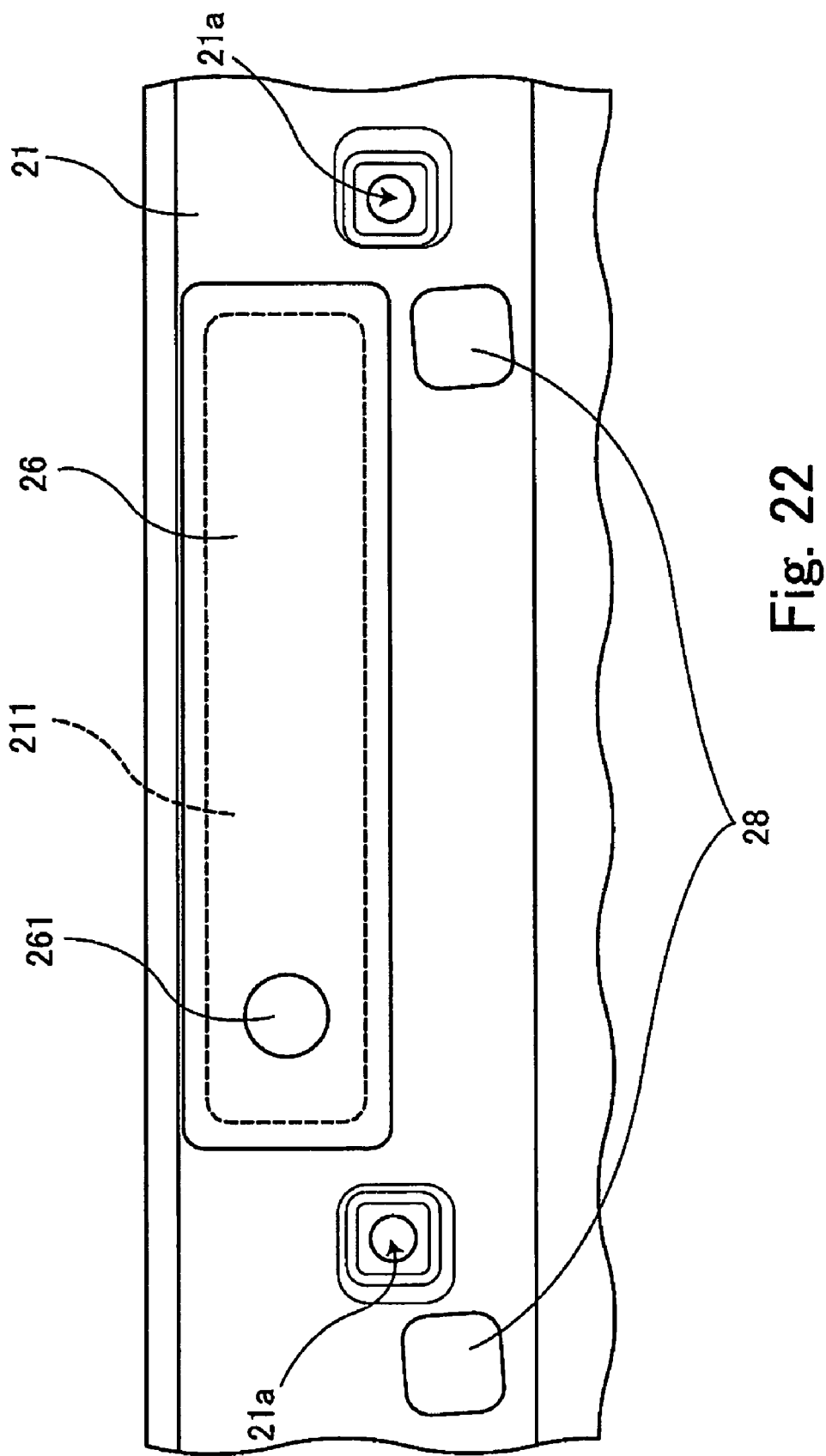
FIG. 22 is a partially enlarged view of the frame cover shown in FIG. 13.

FIG. 22 is a partially enlarged view of the frame cover shown in FIG. 13.

FIG. 22 shows the appearance in which the part that covers the camera unit 25 shown in FIG. 21, of the frame cover 21, is seen from the front side.

Moreover, FIG. 22 shows the appearance in which acrylic board 26 is set into the concave section 211 prepared for in the part with which the camera unit 25 is covered, of the frame cover 21, the concave section 211 being dropped-in by one step from surroundings.

The concave section 211 is provided with a hole 211a through which the tip of barrel 252 of the camera unit 25 is inserted. Moreover, the frame cover 21 shown in FIG. 22 is actually colored to the black. Also regarding the acrylic board 26, only the part that meets the hole 211a prepared for in the concave section 211 is transparent, and another is colored to the black.

Moreover, FIG. 22 shows screw holes 21a for fixing the frame cover 21 to the back cover 22, and in addition facing materials 28 to be set in here to conceal the screw holes 21a after the frame cover 21 is fixed to the back cover 22.

Figure 23:
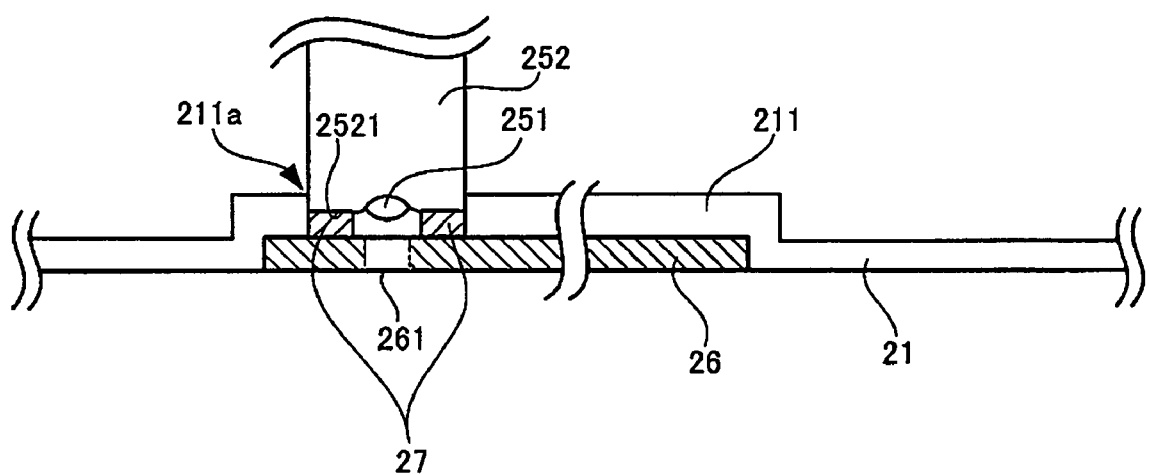
FIG. 23 is a sectional view of the image display unit including a camera unit.

FIG. 23 is a sectional view of the image display unit including a camera unit.

FIG. 23 shows the appearance in which seal material 27 is placed between the front side 2521 of the barrel 252 of the camera unit 25 and the back of the acrylic board 26, the seal material 27 being inserted through the hole 211a of the concave section 211 of the frame cover 21.

The seal material 27 seals up the image taking lens 251 by a few collapsing between the acrylic board 26 and the barrel 252 when the frame cover 21 is fixed to the back cover 22.

Figure 24:
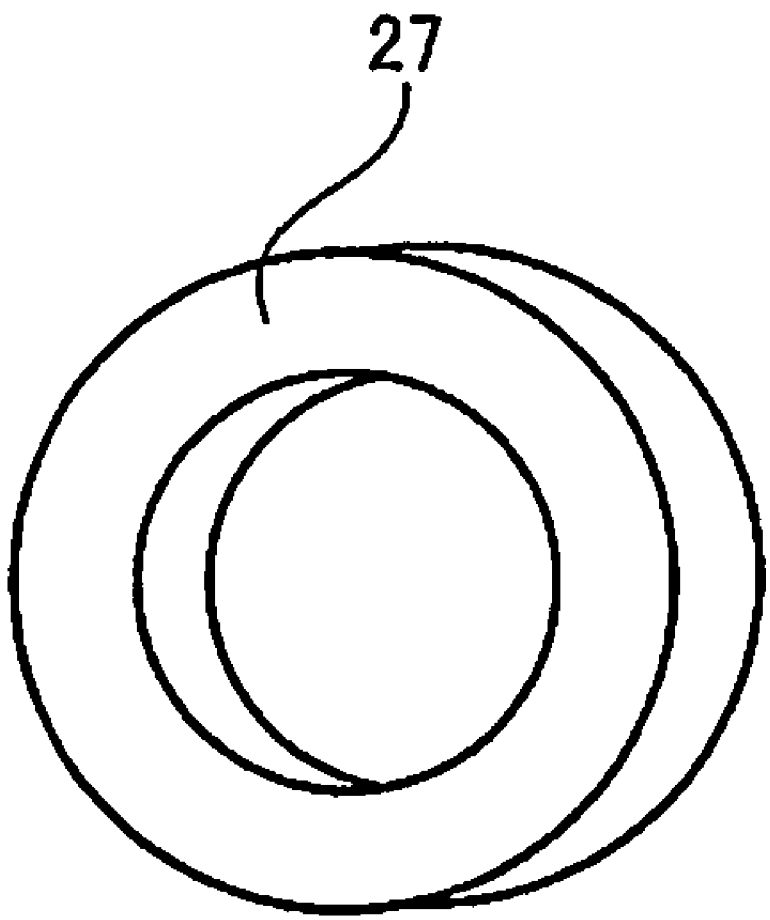
FIG. 24 is a perspective view of a seal member.

FIG. 24 is a perspective view of the seal member.

As the seal material 27, there is adopted one made of hard rubber shaped as a ring, so as not to cover the image taking lens 251 when collapsing. The seal material 27 is the one whose outside diameter may be completely installed on hole 211a prepared for in the concave section 211 of the frame cover 21, and whose thickness is thinner than the thickness of the concave section 211.

According to the present embodiment, the dustproof of the image taking lens 251 is implemented in such a way that the seal material 27 is placed between the acrylic board 26 and the barrel 252. This feature makes it possible to contribute to a miniaturization in surroundings of the barrel 252 without decreasing dustproof as compared with a case where the cap that protrudes even to surroundings of the barrel 252 is installed. Incidentally, it is acceptable that the material of the seal material 27 is a material because it only has to be able to secure sealing up as soft as the sponge, but not the one limited to the hard rubber.

Although the present invention has been described with reference to the particular illustrative embodiments, it is not to be restricted by those embodiments but only by the appended claims. It is to be appreciated that those skilled in the art can change or modify the embodiments without departing from the scope and sprit of the present invention.

What is claimed is:

1. An image display device, comprising:
a display panel that includes a display screen to display an image on a front surface;

a case that accommodates the display panel, the case having a standing wall section that surrounds a surroundings edge of the display panel alienating from the surroundings edge;

a cover that covers a portion between the surroundings edge of the display panel and the standing wall section of the case;

a frame that is arranged on the case and that includes a putting section where surroundings edge of a back the display panel is placed, and an isolation section that touches a side of the display panel and separates the display panel and the standing wall section of the case; and wiring that passes between the isolation section and the standing wall section.

2. The image display device according to claim 1, wherein the frame has a wiring restriction section that projects from the isolation section to the standing wall section to restrict a passage of the wiring.

3. The image display device according to claim 1, wherein at least a part of the putting section is shaped as convexo-concave to touch the back surroundings edge of the display panel intermittently.

4. The image display device according to claim 1, wherein the isolation section has a first slope touching the cover, and the cover has a second slope touching the first slope.

5. An electronic apparatus, comprising:

a first case that incorporates a circuit having an arithmetic operating function, the first case having a keyboard on a top of the first case; and a second case that is connected to the first case via a hinge, the second case being openable and closable with respect to the first case, wherein; the second case has:

a display panel that includes a display screen to display an image on a front surface;

a case that accommodates the display panel, the case having a standing wall section that surrounds a surroundings edge of the display panel alienating from the surroundings edge;

a cover that covers a portion between the surroundings edge of the display panel and the standing wall section of the case;

a frame that is arranged on the case and that includes a putting section where surroundings edge of a back of the display panel is placed, and an isolation section that touches a side of the display panel and separates the display panel and the standing wall section of the case; and wiring that passes between the isolation section and the standing wall section.

6. An image display device, comprising:

a case that accommodates a display panel, the case having a standing wall section that surrounds a surroundings edge of the display panel alienating from the surroundings edge;

a cover that covers a portion between the surroundings edge of the display panel and the standing wall section of the case, wherein the case has:

a putting section where a back edge portion of the display panel is placed; and an isolation section that touches a side of the display panel and separates the display panel and the standing wall section of the case.

7. The image display device according to claim 6, wherein the image display device further has wiring that passes between the isolation section and the standing wall section.

8. The image display device according to claim 6, wherein the isolation section is arranged at same intervals as width of the display panel.

9. The image display device according to claim 6, wherein the isolation section has a wiring restriction section that projects to the standing wall section to restrict a passage of the wiring.

10. The image display device according to claim 6, wherein the putting section and the isolation section are formed in a frame having a single unitary body.

11. The image display device according to claim 10, wherein the frame is formed in another body different from the case, and is fixed on the case.

12. The image display device according to claim 6, wherein a part of the putting section is at least shaped as convexo-concave to touch the back edge portion of the display panel intermittently.

13. The image display device according to claim 6, wherein the isolation section has a first slope touching the cover, and the cover has a second slope touching the first slopee.

14. An electronic apparatus having a first case that incorporates a circuit having an arithmetic operating function, the first case having a keyboard on a top of the first case, and a second case that is connected to the first case via a hinge, the second case being openable and closable with respect to the first case, wherein the electronic apparatus has the image display device recited in claim 6.

\* \* \* \* \*

UNITED STATES PATENT AND TRADEMARK OFFICE
CERTIFICATE OF CORRECTION

| | |
|---|---|
| PATENT NO. | : 7,855,875 B2 |
| APPLICATION NO. | : 12/081861 |
| DATED | : December 21, 2010 |
| INVENTOR(S) | : Masaya Takayanagi |

It is certified that error appears in the above-identified patent and that said Letters Patent is hereby corrected as shown below:

Column 11, Line 9, In Claim 1, delete "back" and insert --back of--, therefor.

Column 11, Line 33, In Claim 5, delete "wherein;" and insert --wherein--, therefor.

Column 12, Line 39 (Approx.), In Claim 13, delete "slopee." and insert --slope.--, therefor.

Signed and Sealed this
Twenty-sixth Day of April, 2011

David J. Kappos
*Director of the United States Patent and Trademark Office*